(12) United States Patent
Kim et al.

(10) Patent No.: US 12,335,968 B2
(45) Date of Patent: Jun. 17, 2025

(54) METHOD AND APPARATUS FOR TRANSMITTING AND RECEIVING SIGNAL IN WIRELESS COMMUNICATION SYSTEM

(71) Applicant: Samsung Electronics Co., Ltd., Suwon-si (KR)

(72) Inventors: Youngbum Kim, Suwon-si (KR); Younsun Kim, Suwon-si (KR); Hyunseok Ryu, Suwon-si (KR); Sungjin Park, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 17/717,788

(22) Filed: Apr. 11, 2022

(65) Prior Publication Data
US 2022/0338233 A1 Oct. 20, 2022

(30) Foreign Application Priority Data
Apr. 9, 2021 (KR) .................. 10-2021-0046576

(51) Int. Cl.
*H04W 72/23* (2023.01)
*H04L 5/00* (2006.01)

(52) U.S. Cl.
CPC .......... *H04W 72/23* (2023.01); *H04L 5/0094* (2013.01)

(58) Field of Classification Search
CPC .............................. H04W 72/23; H04L 5/0094
USPC ........................................................... 370/329
See application file for complete search history.

(56) References Cited

U.S. PATENT DOCUMENTS

| | | | |
|---|---|---|---|
| 2010/0034303 A1 | 2/2010 | Damnjanovic et al. | |
| 2017/0135127 A1 | 5/2017 | Nogami et al. | |
| 2019/0349855 A1 | 11/2019 | Dinan | |
| 2021/0037607 A1 | 2/2021 | Hamidi-Sepehr et al. | |
| 2022/0015126 A1* | 1/2022 | Saber | H04L 5/0044 |
| 2022/0046683 A1* | 2/2022 | Takeda | H04W 72/1273 |
| 2023/0209627 A1* | 6/2023 | Wu | H04L 5/0094 |
| | | | 370/329 |

OTHER PUBLICATIONS 63025989P (Year: 2020).*
R1-2102309 (Year: 2021).*
R1-2104134 (Year: 2021).*
Spreadtrum Communications, Discussion on cross-carrier scheduling from SCell to Pcell, R1-2102471, Apr. 7, 2021.

(Continued)

*Primary Examiner* — Intekhaab A Siddiquee
(74) *Attorney, Agent, or Firm* — Jefferson IP Law, LLP

(57) ABSTRACT

The disclosure relates to a $5^{th}$ generation 5G or $6^{th}$ generation (6G) communication system for supporting a higher data transmission rate. A method of a base station in a wireless communication system is provided. The method includes transmitting, to a user equipment (UE), configuration information for configuring cross-carrier scheduling from a secondary cell (SCell) to a primary cell (PCell), transmitting, to the UE, at least one downlink control information (DCI), the at least one DCI including a carrier indicator field (CIF), and performing scheduling based on the at least one DCI.

8 Claims, 17 Drawing Sheets

(56) References Cited

OTHER PUBLICATIONS

Qualcomm Incorporated, Cross-carrier scheduling from an SCell to the PCell/PSCell, R1-2103188, Apr. 7, 2021.
ZTE, Discussion on Cross-Carrier Scheduling from SCell to PCell, R1-2102503, Apr. 7, 2021.
International Search Report with written opinion dated Jul. 8, 2022, issued in International Patent Application No. PCT/KR2022/005213.
Catt, "Discussion on cross-carrier scheduling from Scell to Pcell"; 3GPP Draft; R1-2102611; 3RD Generation Partnership Project (3GPP); Mobile Competence Center; Apr. 7, 2021.
Extended European Search Report dated Sep. 10, 2024, issued in European Application No. 22785043.5-1206.

* cited by examiner

METHOD AND APPARATUS FOR TRANSMITTING AND RECEIVING SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0046576, filed on Apr. 9, 2021, in the Korean Intellectual Property Office, the disclosure of which is incorporated by reference herein in its entirety.

BACKGROUND

1. Field

The disclosure relates to a method and apparatus for transmitting and receiving a signal in a wireless communication system.

2. Description of Related Art $5^{th}$ Generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter Wave (mmWave) including 28 GHz and 39 GHz. In addition, it has been considered to implement $6^{th}$ Generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR terminal Power Saving, Non-Terrestrial Network (NTN) which is terminal-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random Access Channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on terminal positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of terminal operation capability by utilizing ultra-high-performance communication and computing resources.

As various services are provided along with the development of wireless communication systems as described above, a method of providing these services smoothly is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of overcoming scheduling restrictions imposed by a lack of radio resources in a wireless communication system.

Additional aspects will be set forth in part in the description which follows and, in part, will be apparent from the description, or may be learned by practice of the presented embodiments.

In accordance with an aspect of the disclosure, a method performed by a user equipment (terminal) in a wireless communication system is provided. The method includes receiving information related to a configuration of cross-carrier scheduling of a secondary cell (SCell) from a base station (BS), receiving a physical downlink control channel (PDCCH) by monitoring a search space of the SCell, wherein the PDCCH includes a carrier indicator field, and identifying whether the PDCCH is for the cross-carrier scheduling or self-carrier scheduling based on the carrier indicator field.

In accordance with another aspect of the disclosure, a method performed by a BS in a wireless communication system is provided. The method includes transmitting information related to a configuration of cross-carrier scheduling of an SCell to a terminal, and transmitting a PDCCH in the SCell to the terminal. The carrier indicator field may be used to identify whether the PDCCH is for the cross-carrier scheduling or self-carrier scheduling.

According to an embodiment, when the PDCCH is for the cross-carrier scheduling, a value of the carrier indicator field of the PDCCH may be set to a value equal to a value of a carrier indicator field of a PDCCH transmitted in a primary cell (PCell), and set to a value different from a value of a carrier indicator field of a PDCCH for the self-carrier scheduling of the SCell.

According to an embodiment, when the PDCCH is for the cross-carrier scheduling, a value of the carrier indicator field of the PDCCH may be set to a value different from a value of a carrier indicator field of a PDCCH transmitted in a PCell, and set to a value different from a value of a carrier indicator field of a PDCCH for the self-carrier scheduling of the SCell.

According to an embodiment, when the PDCCH is for the cross-carrier scheduling, a value of the carrier indicator field of the PDCCH may be set to a value different from a value of a carrier indicator field of a PDCCH for the self-carrier scheduling of the SCell, and a PDCCH transmitted in a PCell may not include a carrier indicator field.

According to an embodiment, when the PDCCH is for the cross-carrier scheduling, a value of the carrier indicator field of the PDCCH may be set to a value equal to or different from a value of a carrier indicator field of a PDCCH transmitted in a PCell, and a PDCCH for the self-carrier scheduling of the SCell may not include a carrier indicator field.

In accordance with another aspect of the disclosure, a method of a user equipment (UE) in a wireless communication system is provided. The method includes receiving, from a base station, a first downlink control information (DCI) via a first physical downlink control channel (PDCCH) on a primary cell (PCell) and receiving, from the base station, a second DCI via a second PDCCH on a secondary cell (SCell) for cross-carrier scheduling from the SCell to the PCell, wherein the second DCI includes a second carrier indicator information, and wherein the first DCI includes a first carrier indicator information associated with the second carrier indicator information, in case that the UE is configured for cross-carrier scheduling from the SCell to the PCell.

In accordance with another aspect of the disclosure, a method of a base station in a wireless communication system is provided. The method includes transmitting, to a user equipment (UE), a first downlink control information (DCI) via a first physical downlink control channel (PDCCH) on a primary cell (PCell) and transmitting, to the UE, a second DCI via a second PDCCH on a secondary cell (SCell) for cross-carrier scheduling from the SCell to the PCell, wherein the second DCI includes a second carrier indicator information, and wherein the first DCI includes a first carrier indicator information associated with the second carrier indicator information, in case that the UE is configured for cross-carrier scheduling from the SCell to the PCell.

In accordance with another aspect of the disclosure, a user equipment (UE) in a wireless communication system is provided. The UE includes a transceiver and a controller coupled with the transceiver and configured to receive, from a base station, a first downlink control information (DCI) via a first physical downlink control channel (PDCCH) on a primary cell (PCell) and receive, from the base station, a second DCI via a second PDCCH on a secondary cell (SCell) for cross-carrier scheduling from the SCell to the PCell, wherein the second DCI includes a second carrier indicator information, and wherein the first DCI includes a first carrier indicator information associated with the second carrier indicator information, in case that the UE is configured for cross-carrier scheduling from the SCell to the PCell.

In accordance with another aspect of the disclosure, a base station in a wireless communication system is provided. The base station includes a transceiver and a controller coupled with the transceiver and configured to transmit, to a user equipment (UE), a first downlink control information (DCI) via a first physical downlink control channel (PDCCH) on a primary cell (PCell), and transmit, to the UE, a second DCI via a second PDCCH on a secondary cell (SCell) for cross-carrier scheduling from the SCell to the PCell, wherein the second DCI includes a second carrier indicator information, and wherein the first DCI includes a first carrier indicator information associated with the second carrier indicator information, in case that the UE is configured for cross-carrier scheduling from the SCell to the PCell.

According to an embodiment of the disclosure, a method of scheduling a terminal in a wireless communication system supporting carrier aggregation (CA) is defined, thereby overcoming the problem of cell capacity shortage that may occur in a specific cell.

In accordance with another aspect of the disclosure, a method of a base station in a wireless communication system is provided. The method includes transmitting, to a user equipment (UE), configuration information for configuring cross-carrier scheduling from a secondary cell (SCell) to a primary cell (PCell); transmitting, to the UE, at least one downlink control information (DCI) including a carrier indicator field (CIF); and performing scheduled operation with the UE based on the at least one DCI.

In an embodiment, wherein the at least one DCI includes at least one of first DCI transmitted via a physical downlink control channel (PDCCH) on the SCell or second DCI transmitted via a PDCCH on the PCell, and wherein the first DCI is used for the cross-carrier scheduling from the SCell to the PCell.

In an embodiment, wherein the at least one DCI has a DCI format 0_1 or a DCI format 1_1.

In an embodiment, wherein in case that the UE is configured for the cross-carrier scheduling from the SCell to the PCell, a second CIF in the second DCI is associated with a first CIF in the first DCI.

In an embodiment, wherein the second CIF is set to the same value as the first CIF.

In accordance with another aspect of the disclosure, a method of a user equipment (UE) in a wireless communication system is provided. The method includes receiving, from a base station, configuration information for configuring cross-carrier scheduling from a secondary cell (SCell) to a primary cell (PCell); receiving, from the base station, at least one downlink control information (DCI), the at least one DCI including a carrier indicator field (CIF); and receiving downlink data via a physical downlink shared channel (PDSCH) or transmitting uplink data via a physical uplink shared channel (PUSCH), based on the at least one DCI.

In an embodiment, in case that first DCI of the at least one DCI is received via a physical downlink control channel (PDCCH) on the SCell, identifying the first DCI as DCI used for the cross-carrier scheduling from the SCell to the PCell, based on a first CIF in the first DCI, and in case that second DCI of the at least one DCI is received via a PDCCH on the PCell and the UE is configured for the cross-carrier scheduling from the SCell to the PCell, ignoring a second CIF in the second DCI and identifying the second DCI as DCI for self scheduling on the PCell.

In an embodiment, wherein the at least one DCI has a DCI format 0_1 or a DCI format 1_1.

In an embodiment, wherein in case that the UE is configured for the cross-carrier scheduling from the SCell to the PCell, the second CIF in the second DCI is associated with the first CIF in the first DCI.

In an embodiment, wherein the second CIF is set to the same value as the first CIF.

In accordance with another aspect of the disclosure, a base station in a wireless communication system is provided. The base station comprising: a transceiver; and a processor coupled with the transceiver and configured to: transmit, to a user equipment (UE), configuration information for configuring cross-carrier scheduling from a secondary cell (SCell) to a primary cell (PCell); transmit, to the UE, at least one downlink control information (DCI)including a carrier indicator field (CIF); and perform scheduled operation with the UE based on the at least one DCI.

In accordance with another aspect of the disclosure, a user equipment (UE) in a wireless communication system is provided. The UE includes a transceiver; and a processor coupled with the transceiver and configured to: receive, from a base station, configuration information for configuring cross-carrier scheduling from a secondary cell (SCell) to a primary cell (PCell); receive, from the base station, at least one downlink control information (DCI), the at least one DCI including a carrier indicator field (CIF); and receive downlink data via a physical downlink shared channel (PDSCH) or transmit uplink data via a physical uplink shared channel (PUSCH), based on the at least one DCI.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
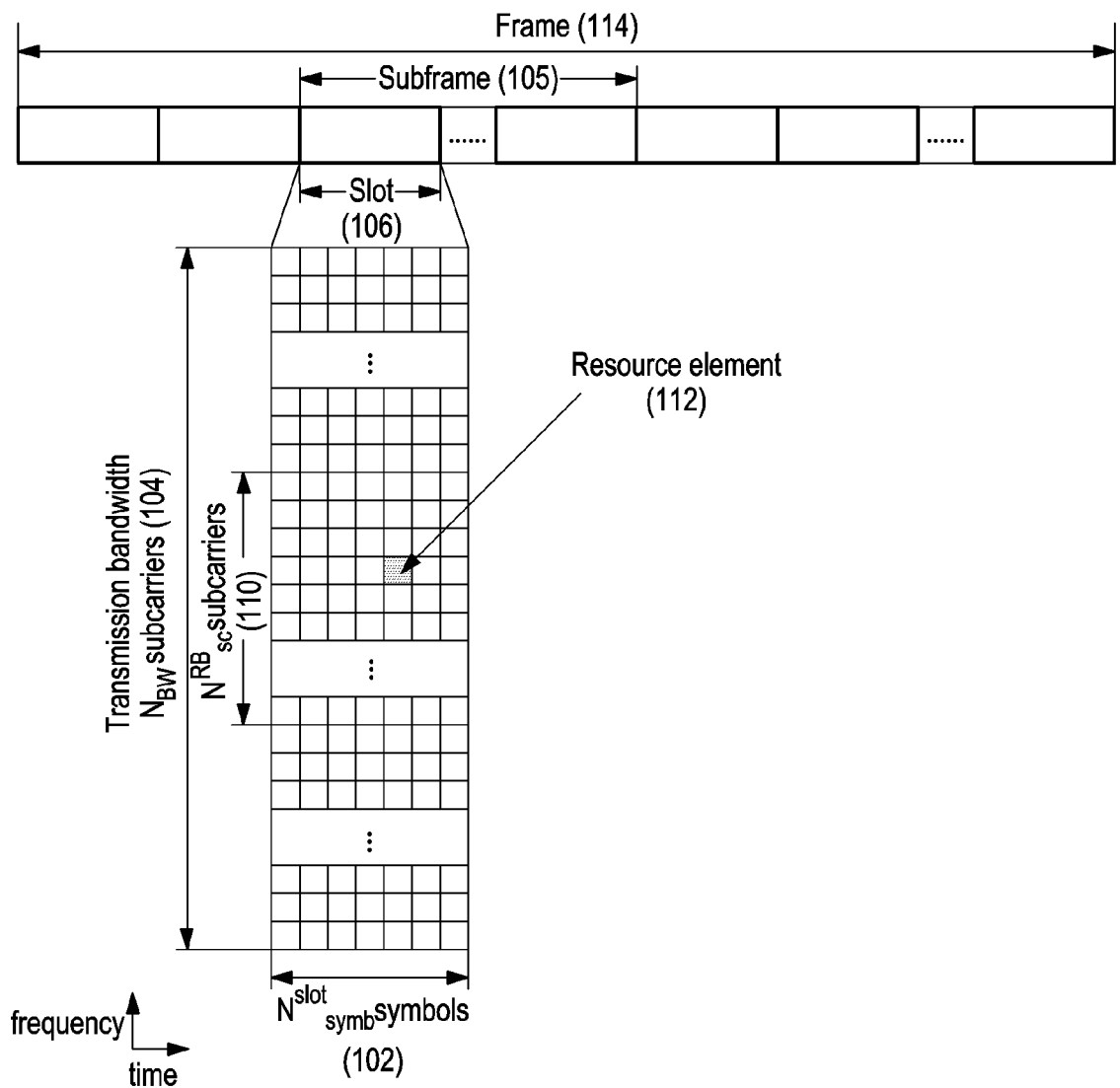
FIG. 1 is a diagram illustrating the basic structure of a time-frequency resource area in a 5th generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification.

It will be understood that each block of the flowchart illustrations and block diagrams, and combinations of blocks in the flowchart illustrations and/or block diagrams can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function/act specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions/acts specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processing units (CPUs) in a device or a secure multimedia card. Further, a "unit" may include one or more processors in embodiments.

In the following description of the disclosure, a detailed description of a related known function or construction will be avoided lest it should obscure the subject matter of the disclosure. Embodiments of the disclosure will be described below with reference to the attached drawings.

In the following description, a term identifying an access node, a term indicating a network entity, a term indicating a message, a term indicating an interface between network objects, and terms indicating various types of identification information are provided by way of example, for convenience of description. Accordingly, the disclosure is not limited to the terms described below, and other terms referring to objects having equivalent technical meanings may be used.

In the following description, the terms physical channel and signal may be used interchangeably with the terms data and control signal. For example, although a physical downlink shared channel (PDSCH) is a term that refers to a physical channel through which data is transmitted, the PDSCH may also be used to refer to data. That is, in the disclosure, when it is said that "a physical channel is transmitted", it may be interpreted equivalently as the expression "data or a signal is transmitted on a physical channel".

In the disclosure, higher-layer signaling refers to a signal transmission scheme in which a base station (BS) transmits a signal to terminal on a downlink (DL) data channel of the physical layer or a terminal transmits a signal to a BS on an uplink (UL) data channel of the physical layer. The higher-signaling may be understood as radio resource control (RRC) signaling or a media access control (MAC) control element (CE).

For convenience of description, the disclosure uses terms and names defined in the 3$^{rd}$ generation partnership project (3GPP) new radio access technology (NR) standards (5$^{th}$ generation (5G) mobile communication standards). However, the disclosure is not limited by the terms and names, and may be equally applied to systems conforming to other standards. The term terminal may refer to a mobile phone, a smart phone, an Internet of Things (IoT) device, a sensor, or other wireless communication devices.

A BS, which is an entity to allocate resources to a terminal, may be at least one of a next generation Node B (gNode B), a gNB, an evolved Node B (eNode B), an eNB, a Node B, a radio access unit, a base station controller (BSC), or a network node. A terminal may include a user equipment (UE), a mobile station (MS), a cellular phone, a smart phone, a computer, or a multimedia system capable of performing a communication function, which should not be construed as limiting the disclosure.

To handle mobile data traffic which has dramatically increased in the recent years, the initial standards of a next-generation communication system, 5G or NR after long term evolution (LTE) (or evolved universal terrestrial radio access (E-UTRA)) and LTE-advanced (LTE-A) (or E-UTRA Evolution) have been completed. Beyond the existing mobile communication systems focused on traditional voice/data communication, the 5G system aims to satisfy various services and requirements, such as enhanced mobile broadband (eMBB) service for improving existing voice/data communication, ultra-reliable and low latency communication (URLLC) service, and massive machine type communication (MTC) supporting communication between multiple things.

Compared to the legacy LTE and LTE-A systems in which a system transmission bandwidth per carrier is limited to up to 20 MHz, the 5G system aims to provide ultra-high-speed data services at up to several Gbps in an ultra-wide bandwidth much wider than in the legacy LTE and LTE-A systems. Accordingly, an ultra-high frequency band from several GHz to up to 100 GHz, in which it is relatively easy to secure the ultra-wide bandwidth, is considered as a candidate frequency for the 5G system. In addition, it is possible to secure a wide-bandwidth frequency for the 5G system through frequency relocation or allocation among frequency bands included in hundreds of MHz to several GHz used in the legacy mobile communication systems.

A radio wave in the ultra-high frequency band has a wavelength of several millimeters and is also referred to as a millimeter wave (mmWave). However, the pathloss of radio waves increases in proportion to a frequency band in the ultra-high frequency band, thereby reducing the coverage of a mobile communication system.

To overcome the drawback of reduced coverage in the ultra-high frequency band, beamforming is applied to increase the propagation distance of radio waves by concentrating the radiation energy of the radio waves on a specific target point using a plurality of antennas. That is, a beamformed signal has a relatively narrow beam width and concentrates radiation energy in the narrow beamwidth to increase the propagation distance of radio waves. Beamforming may be applied to each of a transmitter and a receiver. In addition to the effect of increasing coverage, beamforming reduces interference in areas in other directions than a beamforming direction. For appropriate beamforming, there is a need for a method of accurately measuring a transmission/reception beam and feeding back the measurement. Beamforming may be applied to a control channel or a data channel in a one-to-one correspondence between a specific terminal and a BS. Further, beamforming may also be applied to a common signal that the BS transmits to a plurality of terminals in the system, for example, a synchronization signal, a physical broadcast channel (PBCH), a control channel carrying system information, and a data channel, to increase coverage. When beamforming is applied to the common signal, beam sweeping may further be applied to the common signal to transmit the signal by switching beam directions. Therefore, the common signal may reach a terminal at any position within a cell.

Another requirement of the 5G system is an ultra-low latency service with a transmission delay of about 1 ms between a transmitter and a receiver. As one method to reduce a transmission delay, a frame structure needs to be designed based on a short transmission time interval (TTI) shorter than in LTE and LTE-A. A TTI is a basic time unit for scheduling. In the legacy LTE and LTE-A systems, the TTI is the length of one subframe, 1 ms. For example, 0.5 ms, 0.25 ms, 0.125 ms, or the like shorter than in the legacy LTE and LTE-A systems is available as a short TTI that satisfies the requirements of the ultra-low latency service in the 5G system.

The disclosure relates to a method and apparatus for transmitting and receiving a signal by a terminal in a wireless communication system to which carrier aggregation (CA) is applied.

The disclosure relates to a cellular wireless communication system, and more particularly, to a method of transmitting and receiving a control channel and a data channel by a terminal that performs a CA operation.

The disclosure may provide a method of overcoming scheduling restrictions imposed by a lack of radio resources in a wireless (mobile) communication system.

The disclosure may define a method of scheduling a terminal in a wireless (mobile) communication system supporting CA to solve the problem of cell capacity shortage that may occur in a specific cell.

FIG. 1 is a diagram illustrating the basic structure of a time-frequency resource area in a 5G system according to an embodiment of the disclosure. That is, FIG. 1 illustrates the basic structure of a time-frequency resource area, which is a radio resource area carrying data or a control channel in the 5G system.

Referring to FIG. 1, the horizontal axis represents the time domain, and the vertical axis represents the frequency domain. In the 5G system, a minimum transmission unit in the time domain is an orthogonal frequency division multiplexing (OFDM) symbol. $N_{symb}^{slot}$ symbols 102 form one slot 106, and $N_{slot}^{subframe}$ slots form one subframe 105. 10 subframes each being 1.0 ms long form a 10-ms frame 114. A minimum transmission unit in the frequency domain is a subcarrier, and a total system bandwidth may include $N_{BW}$ subcarriers 104 in total.

A basic resource unit in the time-frequency domain is a resource element (RE) 112, which may be represented by an OFDM symbol index and a subcarrier index. A resource block (RB) may be defined as $N_{sc}^{RB}$ consecutive subcarriers 110 in the frequency domain. In the 5G system, $N_{sc}^{RB}=12$, and a data rate may increase in proportion to the number of RBs scheduled for a terminal.

In the 5G system, a base station may map data on an RB basis, and RBs included in one slot may be generally scheduled for a specific terminal. That is, a basic time unit for scheduling may be a slot, and a basic frequency unit for scheduling may be an RB in the 5G system.

The number, $N_{symb}^{slot}$, of OFDM symbols is determined according to the length of a cyclic prefix (CP) added to each symbol to prevent inter-symbol interference. For example, $N_{symb}^{slot}=14$ in the case of a normal CP, and $N_{symb}^{slot}=12$ in the case of an extended CP. The extended CP is applied to a system having a longer propagation distance than the normal CP, so that orthogonality between symbols may be maintained. In the case of the normal CP, the ratio between a CP length and a symbol length is maintained constant, and thus the overhead of the CP may be maintained constant regardless of a subcarrier spacing (SCS). That is, when the SCS is smaller, the symbol length may be increased, and accordingly, the CP length may also be increased. On the contrary, when the SCS is larger, the symbol length may be decreased, and accordingly, the CP length may also be decreased. The symbol length and the CP length may be inversely proportional to the SCS.

The 5G system may support various frame structures by adjusting the SCS in order to satisfy various services and requirements, for example, as follows.

In terms of an operating frequency band, a larger SCS is more favorable in recovering the phase noise of a high frequency band.

In terms of a transmission time, as the SCS is larger, the symbol length in the time domain decreases. As a result, the slot length decreases, which is advantageous to support an ultra-low latency service such as URLLC.

In terms of a cell size, because a larger cell may be supported with a larger CP length, a larger cell may be supported with a smaller SCS. A cell conceptually refers to an area covered by one base station in mobile communication.

An SCS, a CP length, and so on are essential information for OFDM transmission/reception, and smooth transmission/reception is possible only when the base station and the terminal recognize them as common values. Table 1 illustrates the relationship among SCS configurations μ, SCSs Δf, and CP lengths supported by the 5G system.

TABLE 1

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2 lists the number, $N_{symb}^{slot}$, of symbols per slot, the number, $N_{slot}^{frame,\mu}$, of slots per frame, and the number, $N_{slot}^{subframe,\mu}$, of slots per subframe for each SCS configuration μ in the case of the normal CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 lists the number, $N_{symb}^{slot}$, of symbols per slot, the number, $N_{slot}^{frame,\mu}$, of slots per frame, and the number, $N_{slot}^{frame,\mu}$, of slots per subframe for each SCS configuration μ in the case of the extended CP.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 2:
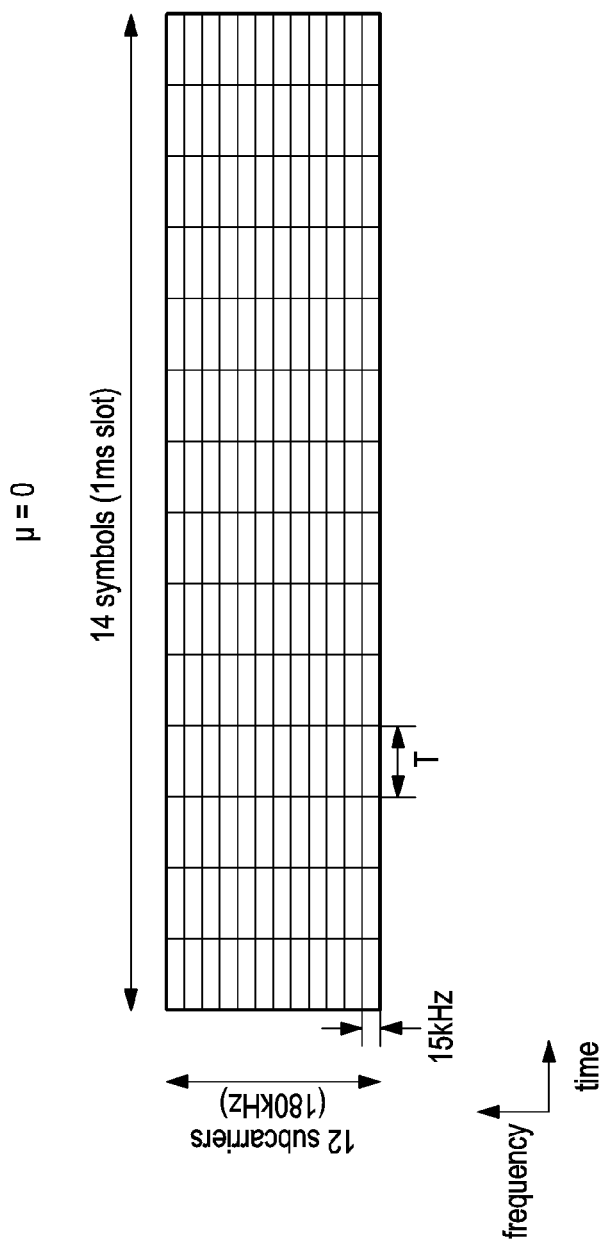
FIG. 2 is a diagram illustrating a frame structure in the 5G system according to an embodiment of the disclosure.
Figure 3:
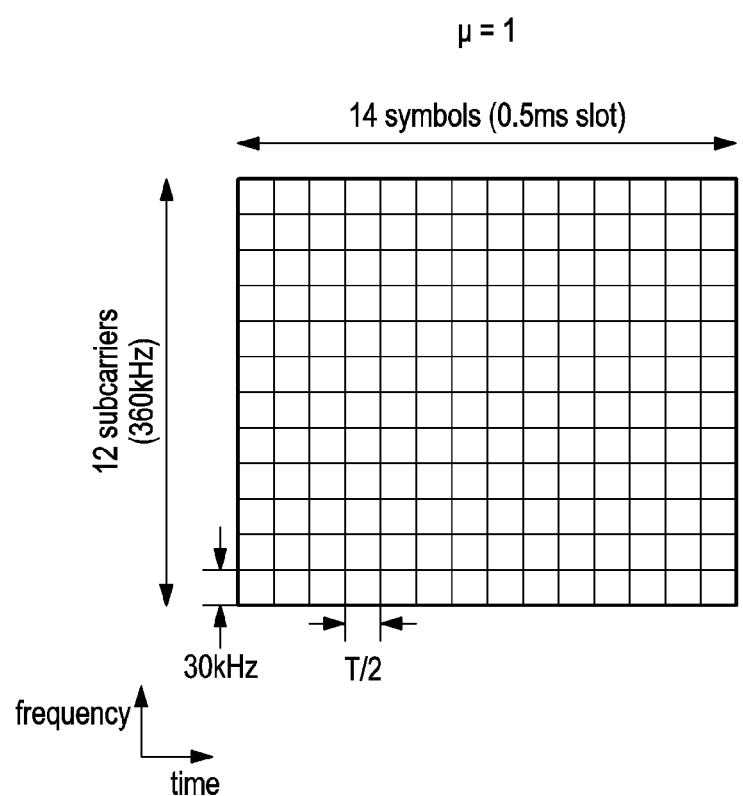
FIG. 3 is a diagram illustrating another frame structure in the 5G system according to an embodiment of the disclosure.
Figure 4:
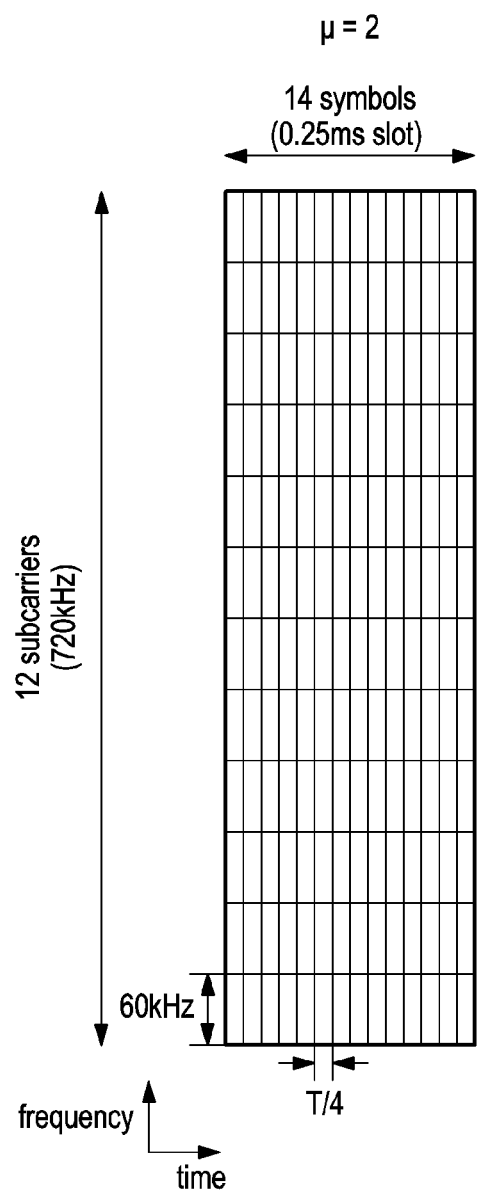
FIG. 4 is a diagram illustrating another frame structure in the 5G system according to an embodiment of the disclosure.

FIGS. 2, 3, and 4 illustrate frame structures for SCS configurations μ (=0, 1, 2) in the case of the normal CP, respectively. In the examples of FIGS. 2, 3, and 4, an SCS, a CP length, and a slot length are included in an essential parameter set that defines a frame structure, by way of example.

At the initial introduction stage of the 5G system, at least coexistence or a dual mode operation with the legacy LTE/LTE-A system is expected. Therefore, the legacy LTE/LTE-A system may provide a stable system operation to a terminal, and the 5G system may provide an advanced service to the terminal. Accordingly, the frame structures of the 5G system need to include the frame structure or essential parameter set (SCS=15 kHz) of LTE/LTE-A.

FIG. 2 is a diagram illustrating a frame structure in the 5G system according to an embodiment of the disclosure. That is, FIG. 2 illustrates a 5G frame structure or essential parameter set identical to the LTE/LTE-A frame structure.

Referring to FIG. 2, a frame structure with SCS configuration 0 (μ=0) is illustrated. In the frame structure, the SCS is 15 kHz, a 1-ms slot includes 14 symbols, and an RB includes 12 subcarriers (=180 kHz=12×15 kHz). In this case, one slot may form one subframe, and 10 subframes may form one frame.

FIG. 3 is a diagram illustrating another frame structure in the 5G system according to an embodiment of the disclosure.

Referring to FIG. 3, a frame structure with SCS configuration 1 (μ=1) is illustrated. In the frame structure, the SCS is 30 kHz, a 0.5-ms slot includes 14 symbols, and an RB includes 12 subcarriers (=360 kHz=12×30 kHz). That is, compared to the frame structure of FIG. 2, the SCS and the RB size are doubled, and the slot length and the symbol length are decreased to a half in the frame structure of FIG. 3. In this case, two slots may form one subframe, and 20 subframes may form one frame.

FIG. 4 is a diagram illustrating another frame structure in a 5G system according to an embodiment of the disclosure.

Referring to FIG. 4, a frame structure with SCS configuration 2 (μ=2) is illustrated. In the frame structure, the SCS is 60 kHz, a 0.25-ms subframe includes 14 symbols, and an RB includes 12 subcarriers (=720 kHz=12×60 kHz). That is, compared to the frame structure of FIG. 2, the SCS and the RB (or physical RB (PRB)) size are increased by four times, and the slot length and the symbol length are decreased to one quarter in the frame structure of FIG. 4. In this case, 4 slots may form one subframe, and 40 subframes may form one frame.

That is, the frame structures described in FIGS. 2, 3, and 4 may be generalized to an integer multiple relationship between the frame structures in terms of an essential parameter set such as SCS, CP length, slot length, and so on, to provide high scalability. To represent a reference time unit independent of the frame structures, a subframe having a fixed length of 1 ms may be defined.

The frame structures illustrated in FIGS. 2, 3, and 4 may be applied to various scenarios. In terms of a cell size, as the CP length is larger, a larger cell may be supported, and thus the frame structure of FIG. 2 may support a larger cell than the frame structures of FIGS. 3 and 4. In terms of an operating frequency band, as the SCS increases, it is more advantageous in recovering the phase noise of a high frequency band. Therefore, the frame structure of FIG. 4 may support a relatively high operating frequency, compared to the frame structures of FIGS. 2 and 3. In terms of a service, as the slot length being a basic time unit for scheduling is smaller, it is better in supporting an ultra-low latency service like URLLC. Accordingly, the frame structure of FIG. 4 may be relatively suitable for the URLLC service, compared to the frame structures of FIGS. 2 and 3.

In the following description of the disclosure, uplink (UL) may refer a radio link through which a terminal transmits data or a control signal to a base station, and downlink (DL) may refer to a radio link through which the base station transmits data or a control signal to the terminal.

In an initial access stage in which the terminal initially accesses the system, the terminal may acquire DL time and frequency synchronization and a cell identifier (ID) from a synchronization signal received from the base station. The terminal may receive a PBCH using the obtained cell ID, and obtain a master information block (MIB) being essential system information from the PBCH. Additionally, the terminal may obtain cell-common control information related to transmission and reception by receiving system information (a system information block (SIB)) from the base station. The cell-common control information related to transmission and reception may include random access-related control information, paging-related control information, and/or common control information for various physical channels.

The synchronization signal is a reference signal for cell search, and an SCS may be applied to the synchronization signal on a frequency band basis adaptively according to a channel environment such as phase noise. In the case of a data channel or a control channel, a different SCS may be applied according to a service type to support various services as described above.

Figure 5:
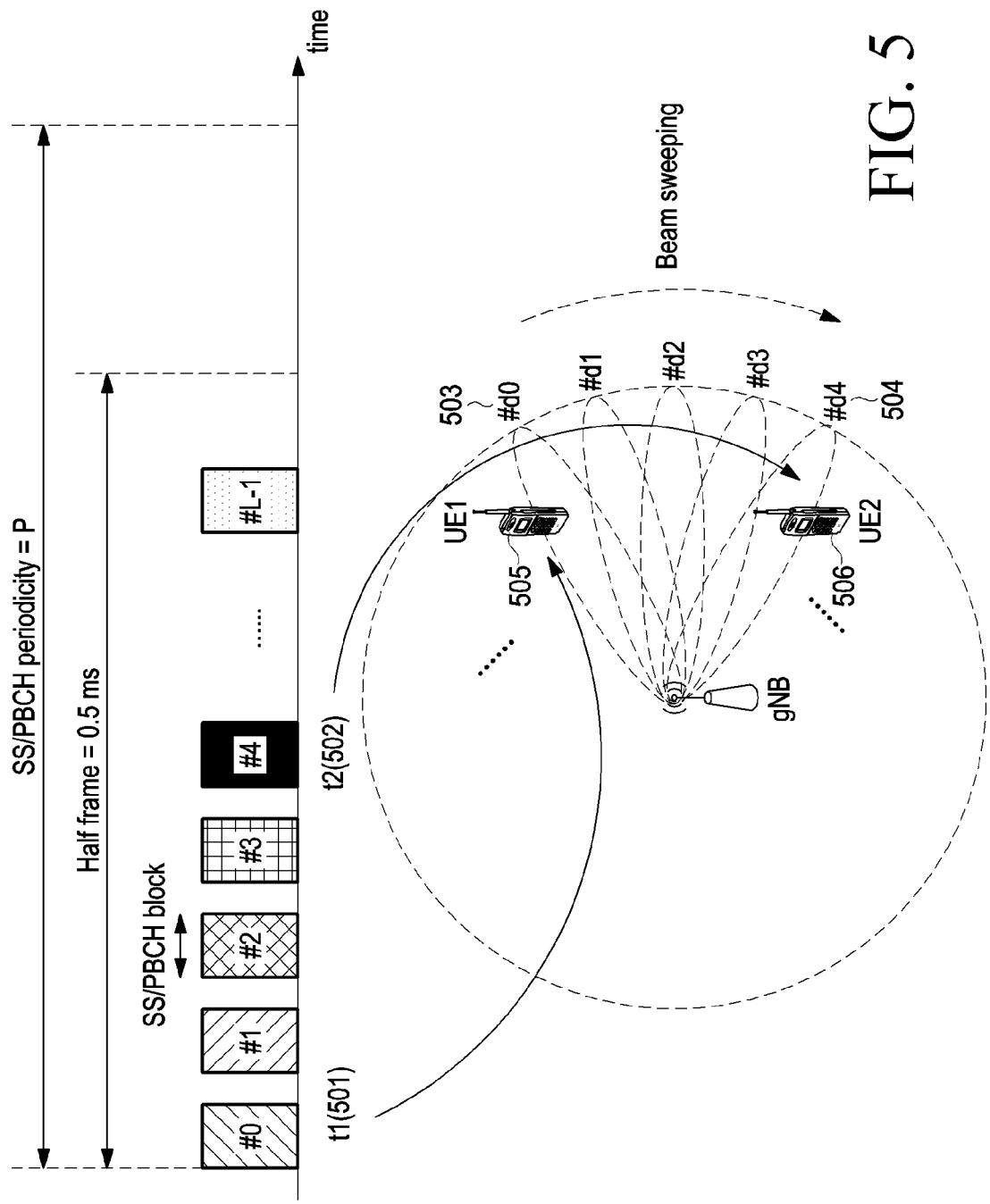
FIG. 5 is a diagram illustrating a time-domain mapping structure and a beam sweeping operation for a synchronization signal according to an embodiment of the disclosure.

FIG. 5 is a diagram illustrating a time-domain mapping structure and a beam sweeping operation for a synchronization signal according to an embodiment of the disclosure.

For description, the following elements may be defined.

Primary Synchronization Signal (PSS): A signal that serves as a reference for DL time/frequency synchronization.

Secondary Synchronization Signal (SSS): A signal that serves as a reference for DL time/frequency synchronization and provides cell ID information. Additionally, it may serve as a reference signal for PBCH demodulation.

Physical Broadcast Channel (PBCH): A channel that provides an MIB, which is essential system information required for transmitting and receiving a data channel and a control channel at the terminal. The essential system information may include search space-related control information representing information about mapping of a control channel to radio resources, scheduling control information for a separate data channel carrying system information, and/or information about a frame unit index serving as a timing reference, system frame number (SFN).

Synchronization Signal (SS)/PBCH Block or synchronization signal block (SSB): The SS/PBCH block includes N OFDM symbols, and is a combination of a PSS, an SSS, and a PBCH. In a system using beam sweeping, the SS/PBCH block is a smallest unit to which beam sweeping is applied. N=4 in the 5G system. The base station may transmit a maximum of L SS/PBCH blocks, and the L SS/PBCH blocks are mapped within a half-frame (0.5 ms). The L SS/PBCH blocks are periodically repeated with a specific periodicity P. The base station may indicate the periodicity P to the terminal by signaling. When there is no separate signaling of the periodicity P, the terminal applies a preset default value.

Referring to FIG. 5, beam sweeping is applied on an SS/PBCH block basis over time. In the example of FIG. 5, a first terminal (terminal1) 505 receives an SS/PBCH block on a beam radiated in a direction #d0 503 by beamforming applied to SS/PBCH block #0 at a time t1 501. In addition, a second terminal (terminal2) 506 receives the SS/PBCH block on a beam radiated in a direction #d4 504 by beamforming applied to SS/PBCH block #4 at a time t2 502. The terminal may obtain an optimum synchronization signal on a beam radiated from the base station in the direction in which the terminal is located. For example, it may be difficult for terminal1 505 to acquire time/frequency synchronization and essential system information from the SS/PBCH block on the beam radiated in the direction #d4 away from the position of terminal1 505.

In addition to the initial access procedure, the terminal may receive the SS/PBCH block to determine whether the radio link quality of a current cell is maintained at or above a certain level. Further, in a handover procedure from the current cell to a neighbor cell, the terminal may receive an SS/PBCH block of the neighbor cell to determine the radio link quality of the neighbor cell and acquire time/frequency synchronization with the neighbor cell.

After the terminal obtains the MIB and the system information from the base station in the initial access procedure, the terminal may perform a random access procedure to switch a link with the base station to a connected state (or RRC_CONNECTED state). Upon completion of the random access procedure, the terminal switches to the connected state, and one-to-one communication is enabled between the base station and the terminal. The random access procedure will be described below in detail with reference to FIG. 6.

Figure 6:
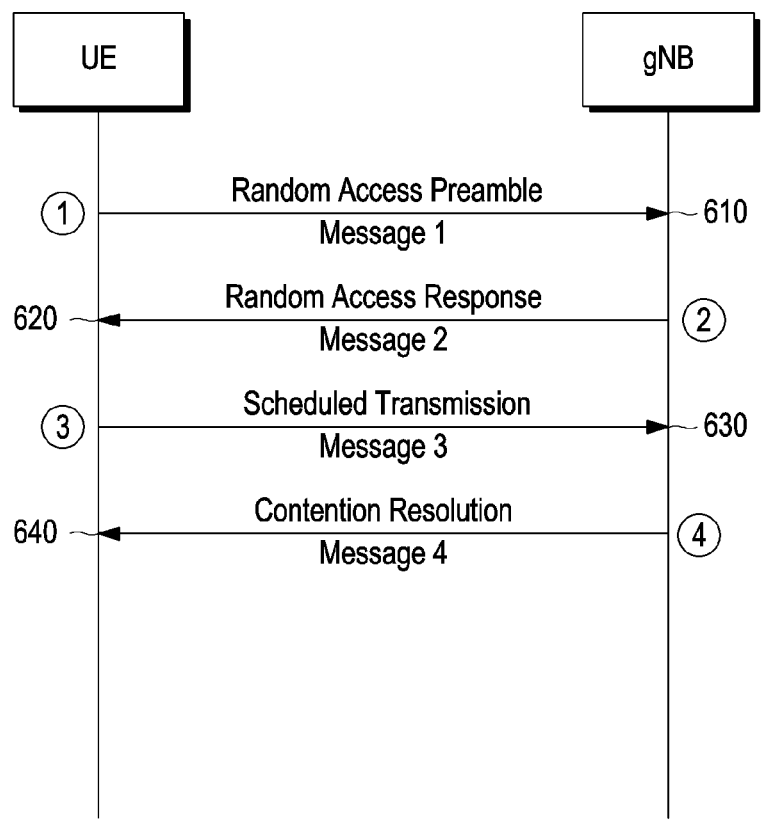
FIG. 6 is a diagram illustrating a signal flow for a random access procedure according to an embodiment of the disclosure.

FIG. 6 is a diagram illustrating a random access procedure according to an embodiment of the disclosure.

Referring to FIG. 6, in a first operation 610 of the random access procedure, the terminal transmits a random access preamble to the base station. In the random access procedure, the random access preamble, which is the first message transmitted by the terminal, may be referred to as message 1. The base station may measure a transmission delay between the terminal and the base station in the random access preamble and acquire UL synchronization with the random access preamble. In this case, the terminal may arbitrarily select a random access preamble from a random access preamble set given preliminarily by the system information. The initial transmission power of the random access preamble may be determined according to a terminal-measured pathloss between the base station and the terminal. Further, the terminal may transmit the random access preamble by determining the transmission beam direction of the random access preamble from a synchronization signal received from the base station.

In a second operation 620, the base station transmits a UL transmission timing control command to the terminal based on the transmission delay value measured in the random access preamble received in the first operation 610. In addition, the base station may transmit information about UL resources to be used by the terminal and a power control command as scheduling information. The scheduling information may include control information for a UL transmission beam of the terminal.

When the terminal fails to receive a random access response (RAR) (or message 2), which is scheduling information for message 3, within a predetermined time from the base station in the second operation 620, the procedure may go back to the first operation 610. When the first operation 610 is performed again, the terminal may increase the transmission power of a random access preamble by a specific operation and transmit the random access preamble (power ramping), thereby increasing the probability of receiving the random access preamble at the base station.

In a third operation 630, the terminal transmits UL data (message 3) including its terminal ID to the base station in the UL resources allocated in the second operation 620 on a UL channel (physical uplink shared channel (PUSCH)). The transmission timing of the UL data channel carrying message 3 may follow the timing control command received from the base station in the second operation 620. The transmission power of the UL data channel carrying message 3 may be determined in consideration of the power control command received from the base station and a power ramping value of the random access preamble in the second operation 620. The UL data channel carrying message 3 may mean the first UL data signal that the terminal transmits to the base station after transmitting the random access preamble.

In a fourth operation 640, when the base station determines that the terminal has performed random access without colliding with another terminal, the base station transmits data (message 4) including the ID of the terminal that has transmitted the UL data in the third operation 630 to the terminal. Upon receipt of the signal from the base station in the fourth operation 640, the terminal may determine that the random access is successful. The terminal may then transmit hybrid automatic repeat request (HARQ)-acknowledgment (ACK) information indicating whether message 4 has been successfully received to the base station on a UL control channel (physical uplink control channel (PUCCH)).

When the base station fails to receive the data signal from the terminal due to collision between the data transmitted from the terminal in the third operation 630 and data from another terminal, the base station may not transmit any more data to the terminal. Accordingly, when the terminal fails to receive data from the base station within a predetermined time in the fourth operation 640, the terminal may determine that the random access procedure has failed and start over from the first operation 610.

Upon successful completion of the random access procedure, the terminal switches to the connected state, and one-to-one communication between the base station and the terminal may be possible. The base station may receive a report of UE capability information from the connected terminal and adjust scheduling with reference to the UE capability information about the terminal. The terminal may indicate to the base station whether the terminal itself supports a specific function, a maximum allowed value for the function supported by the terminal, and so on by the UE capability information. Accordingly, UE capability information that each terminal reports to the base station may be a different value.

For example, the terminal may report UE capability information including at least part of the following control information to the base station.

Control information related to frequency band supported by the terminal

Control information related to channel bandwidth supported by the terminal

Figure 7:
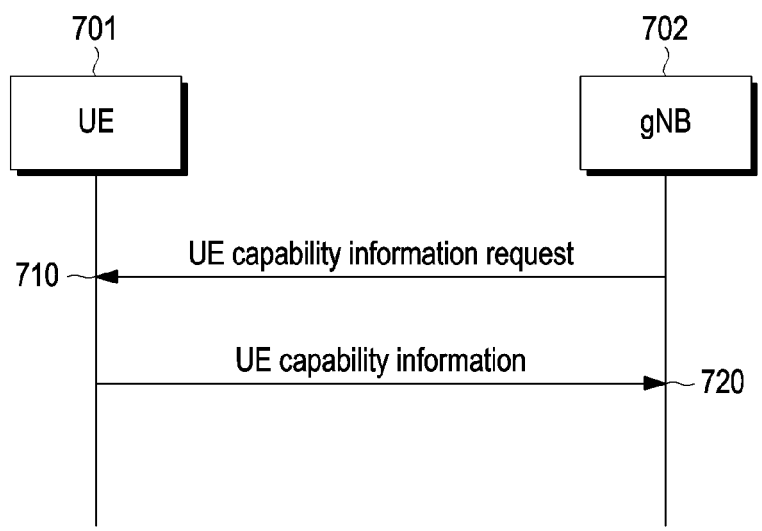
FIG. 7 is a diagram illustrating a signal flow for a procedure of reporting user equipment (UE) capability information to a base station (BS) according to an embodiment of the disclosure.

Control information related to maximum modulation scheme supported by the terminal Control information related to maximum number of beams supported by the terminal Control information related to maximum number of layers supported by the terminal Control information related to channel state information (CSI) reporting supported by the terminal Control information indicating whether the terminal supports frequency hopping When CA is supported, bandwidth-related control information When CA is supported, control information indicating whether cross-carrier scheduling is supported FIG. 7 is a diagram illustrating a signal flow for a procedure of reporting UE capability information to a base station by a terminal according to an embodiment of the disclosure.

Referring to FIG. 7, in operation 710, a base station 702 may transmit a UE capability information request message to a terminal 701. In response to the UE capability information request from the base station, the terminal transmits UE capability information to the base station in operation 720.

A scheduling method for transmitting DL data to the terminal or instructing the terminal to transmit UL data by the base station will be described below.

Downlink control information (DCI) is control information that a base station transmits to a terminal on DL, and may include DL data scheduling information or UL data scheduling information for the terminal. In general, the base station may independently channel-encode DCI for each terminal and then transmit the DCI to the terminal on a physical downlink control channel (PDCCH), which is a DL physical control channel.

The base station may apply a predetermined DCI format and operate the DCI format for the terminal to be scheduled, depending on the purpose of the DCI such as whether the DCI is scheduling information for DL data (a DL assignment), whether the DCI is scheduling information for UL data (a UL grant), whether spatial multiplexing using multiple antennas is applied, or whether the DCI is for power control.

The base station may transmit DL data to the terminal on a PDSCH, which is a physical channel for DL data transmission. The base station may indicate scheduling information such as specific mapping positions in the time and frequency domains, a modulation scheme, HARQ-related control information, and power control information for the PDSCH to the terminal by DCI related to DL data scheduling information among DCIs transmitted on the PDCCH.

The terminal may transmit UL data to the base station on a PUSCH, which is a physical channel for UL data transmission. The base station may indicate scheduling information such as specific mapping positions in the time and frequency domains, a modulation scheme, HARQ-related control information, and power control information for the PUSCH to the terminal by DCI related to UL data scheduling information among DCIs transmitted on the PDCCH.

To achieve a high-speed data service of several Gbps, signal transmission and reception in an ultra-wide bandwidth of tens to hundreds of MHz or several GHz may be supported in the 5G system, as described above. The signal transmission and reception in the ultra-wide bandwidth may be supported through a single component carrier (CC) or CA in which multiple CCs are aggregated. When a mobile communication operator fails to secure a frequency with a bandwidth sufficient to provide an ultra-high-speed data service in a single CC, CCs each having a relatively small bandwidth size are aggregated to increase the sum of frequency bandwidths and thus enable the ultra-high-speed data service.

Figure 8:
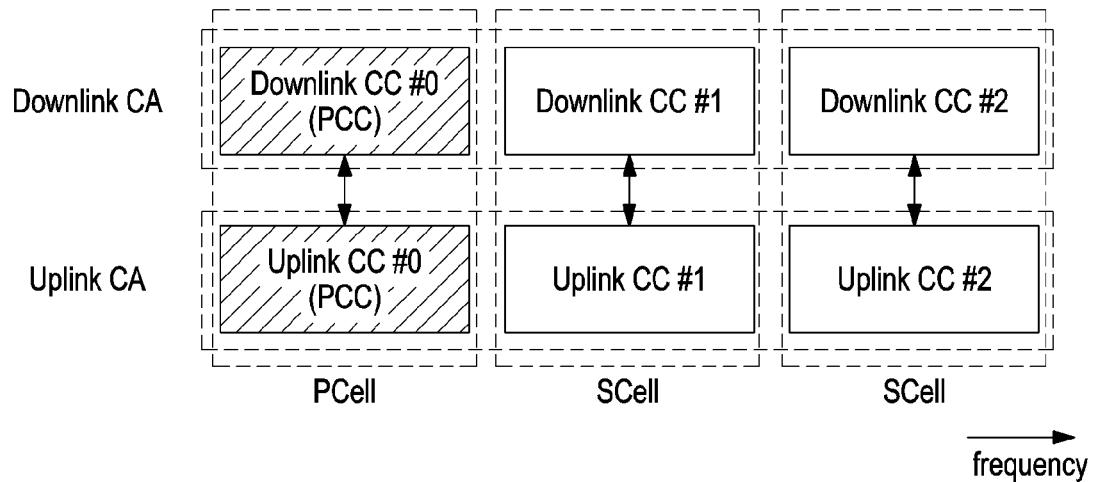
FIG. 8 is a conceptual diagram illustrating carrier aggregation (CA) according to an embodiment of the disclosure.

FIG. 8 is a conceptual diagram illustrating CA according to an embodiment of the disclosure.

Referring to FIG. 8, an example of configuring a 5G system by aggregating three CCs for each of UL and DL is illustrated. In a CA system, Each CC may be operated as a primary cell (PCell) or a secondary cell (SCell). A PCell (or first cell) may refer to a cell that provides basic radio resources to a terminal and serves as a reference for performing operations such as initial access and handover of the terminal. The PCell may include a DL primary frequency (or primary component carrier (PCC)) and a UL primary frequency. The terminal may transmit uplink control information (UCI) including an HARQ acknowledgement/negative acknowledgement (ACK/NACK) that is feedback indicating whether data received from the base station has an error, or CSI indicating a channel state between the base station and the terminal to the base station on the UL control channel, PUCCH. The PUCCH may be transmitted in the PCell. The SCell (or second cell) is a cell that provides radio resources in addition to the PCell to the terminal, and may include a DL secondary frequency (or secondary component carrier (SCC)) and a UL secondary frequency, or a UL secondary frequency. Each CC is independently configured, and DL CA and UL CA may be applied independently of each other. For example, CA with a CC having a 100-MHz bandwidth and two CCs each having a 50-MHz bandwidth may be applied to DL, whereas only one CC having a 100-MHz bandwidth may be used for UL (that is, CA may not be applied to the UL). In the disclosure, unless otherwise stated, the terms cell and CC may be interchangeably used without distinction. The base station may indicate a CA-related configuration such as control information related to CCs to be aggregated, the number of aggregated CCs, or the bandwidth of each CC to the terminal by signaling.

In the CA system, control information and data may be generated and transmitted independently on a CC basis. Specifically, terminal scheduling schemes in the CA system may be classified into two types: self-carrier scheduling and cross-carrier scheduling. In the disclosure, self-carrier scheduling may mean, for example, that a serving cell is scheduled by its PDCCH, and cross-carrier scheduling may mean, for example, that a serving cell is scheduled by a PDCCH of another cell (scheduling cell). In the disclosure, self-carrier scheduling may be referred to shortly as self-scheduling.

Figure 9:
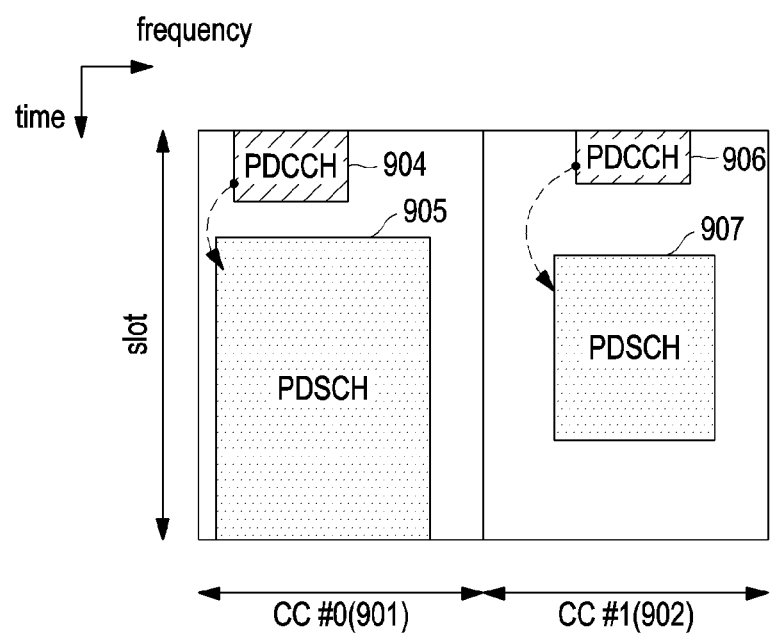
FIG. 9 is a diagram illustrating a self-carrier scheduling method in CA according to an embodiment of the disclosure.

FIG. 9 is a diagram illustrating a self-carrier scheduling method in CA according to an embodiment of the disclosure.

Referring to FIG. 9, a 5G system is assumed, in which two DL CCs, CC #0 901 and CC #1 902 are aggregated. In the example of FIG. 9, the base station may transmit DL data channels, PDSCHs 905 and 907 to any terminal in CC #0 901 and CC #1 902. A PDCCH 904 for scheduling the PDSCH 905 in CC #0 901 may be transmitted to the terminal in CC #0 901, and a PDCCH 906 for scheduling the PDSCH 907 in CC #1 902 may be transmitted to the terminal in CC #1 902. As such, the scheduling scheme in which a data channel and a control channel for scheduling the data channel are transmitted in the same carrier or the same cell may be referred to as self-carrier scheduling.

Figure 10:
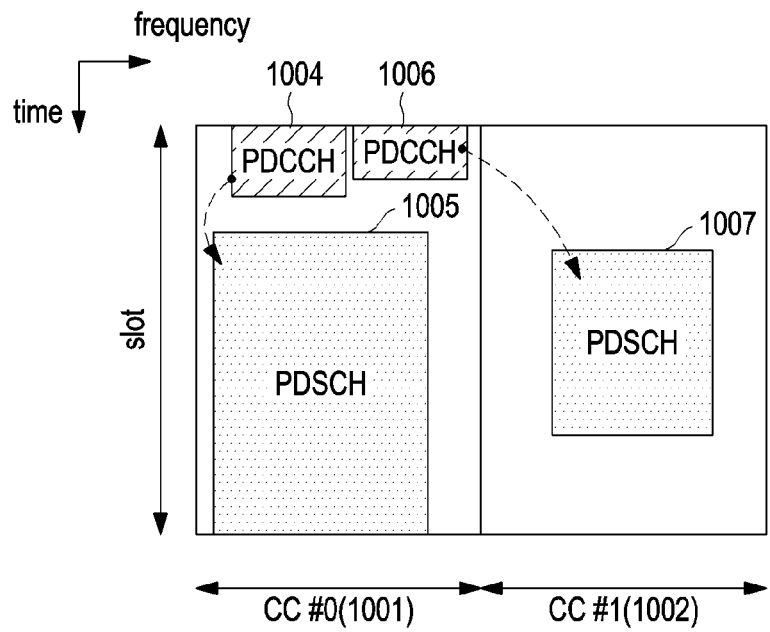
FIG. 10 is a diagram illustrating a cross-carrier scheduling method in CA according to an embodiment of the disclosure.

FIG. 10 is a diagram illustrating a cross-carrier scheduling method in CA according to an embodiment of the disclosure.

Referring to FIG. 10, a CA system is illustrated, in which two DL CCs, CC #0 1001 and CC #1 1002 are aggregated. In FIG. 10, the base station may transmit DL data channels, PDSCHs 1005 and 1007 to any terminal in CC #0 1001 and CC #1 1002. Both of a PDCCH 1004 for scheduling a PDSCH 1005 in CC #0 1001 and a PDCCH 1006 for scheduling a PDSCH 1007 in CC #1 1002 may be transmitted to the terminal in CC #0 1001. That is, in the case of CC #1 1001, a data channel and a control channel for scheduling the data channel may be transmitted in different carriers or different cells. This scheduling scheme may be referred to as cross-carrier scheduling.

While DL CA has been described above with reference to FIGS. 9 and 10, the examples of FIGS. 9 and 10 may be similarly applied to UL CA.

Compared to self-carrier scheduling, cross-carrier scheduling may achieve the following effects.

1) Control channel offloading: When there is a lack of radio resources for transmitting a control channel in a specific carrier, the control channel may be transmitted in another carrier having relatively sufficient radio resources. For example, in the illustrated case of FIG. 10, when the bandwidth of CC #1 is 20 MHz and the bandwidth of CC #0 is 100 MHz, the radio resources of CC #0 are relatively sufficient to transmit a control channel.

2) Control channel interference management: Relatively severe interference may occur in a specific carrier due to surrounding environmental factors, frequency characteristics, and so on. The interference may degrade the transmission/reception performance of a control channel. In this case, the control channel transmission/reception performance degradation may be avoided by transmitting the control channel in a carrier having relatively weak interference. On the other hand, because a data channel may be recovered through an HARQ operation despite a transmission/reception error, the interference-incurred performance degradation is relatively weak in the data channel, compared to the control channel.

Dynamic spectrum sharing will be described below. A scenario in which the LTE system and the 5G system are deployed to operate with overlap in the same frequency band or frequency area may be referred to as dynamic spectrum sharing (DSS) or LTE-NR co-existence. In a DSS system, whether to schedule LTE or 5G for a terminal may be determined according to a change in LTE traffic and 5G traffic. In the early stage of 5G system deployment, in which LTE traffic gradually decreases and 5G traffic gradually increases, DSS may be used to accelerate 5G use without additional frequency allocation by maximizing the use of existing frequencies. From the perspective of communication service providers, DSS may enable efficient use of frequencies that have already been secured, without wasting the frequencies.

Figure 11A:
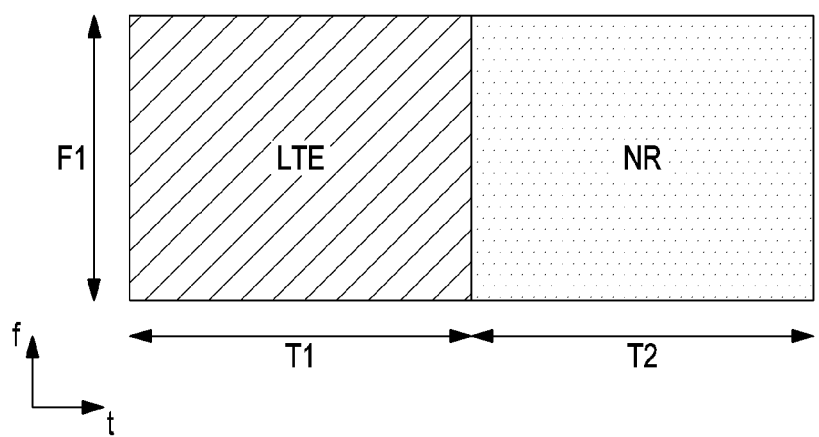
FIG. 11A is a diagram illustrating an example of overlap in the same frequency band between a long term evolution (LTE) system and a 5G system according to an embodiment of the disclosure.
Figure 11B:
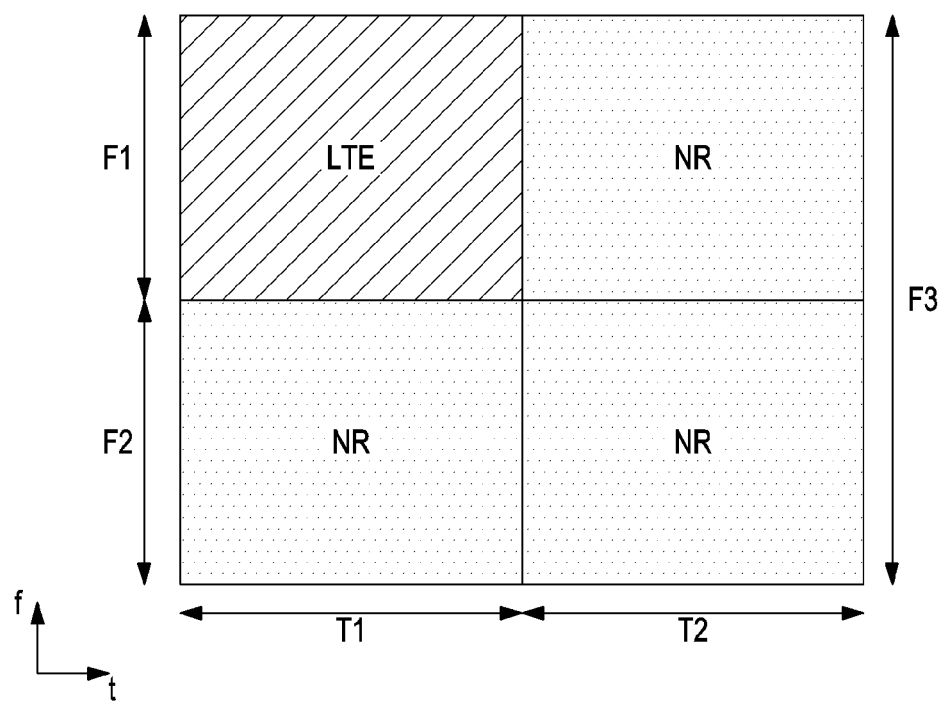
FIG. 11B is a diagram illustrating an example of partial overlap in the frequency domain between the LTE system and the 5G system according to an embodiment of the disclosure.

FIGS. 11A and 11B are diagrams illustrating the concept of DSS.

FIG. 11A illustrates an example in which the LTE system and the 5G system overlap in the same frequency band according to an embodiment of the disclosure.

Referring to FIG. 11A, the base station may determine when to schedule LTE and 5G according to the distribution of LTE traffic and 5G traffic. FIG. 11A illustrates an example in which LTE is scheduled during a time period T1, and 5G is scheduled during a time period T2.

FIG. 11B illustrates an example in which the LTE system and the 5G system partially overlap with each other in the frequency domain according to an embodiment of the disclosure.

Referring to FIG. 11B, LTE is scheduled in a frequency area F1 and 5G is scheduled in a frequency area F2, during the time period T1. FIG. 11B illustrates an example in which 5G is scheduled in a frequency area F3 (=F1+F2) during the time period T2. Although LTE and 5G share time/frequency resources in both of FIGS. 11A and 11B, the degradation of transmission/reception performance may be minimized by preventing LTE and 5G from collide in time/frequency resources at any instant.

To describe collision avoidance between LTE and 5G in the above-described DSS system, a DL radio resource structure of the LTE system will first be described with reference to FIG. 12.

Figure 12:
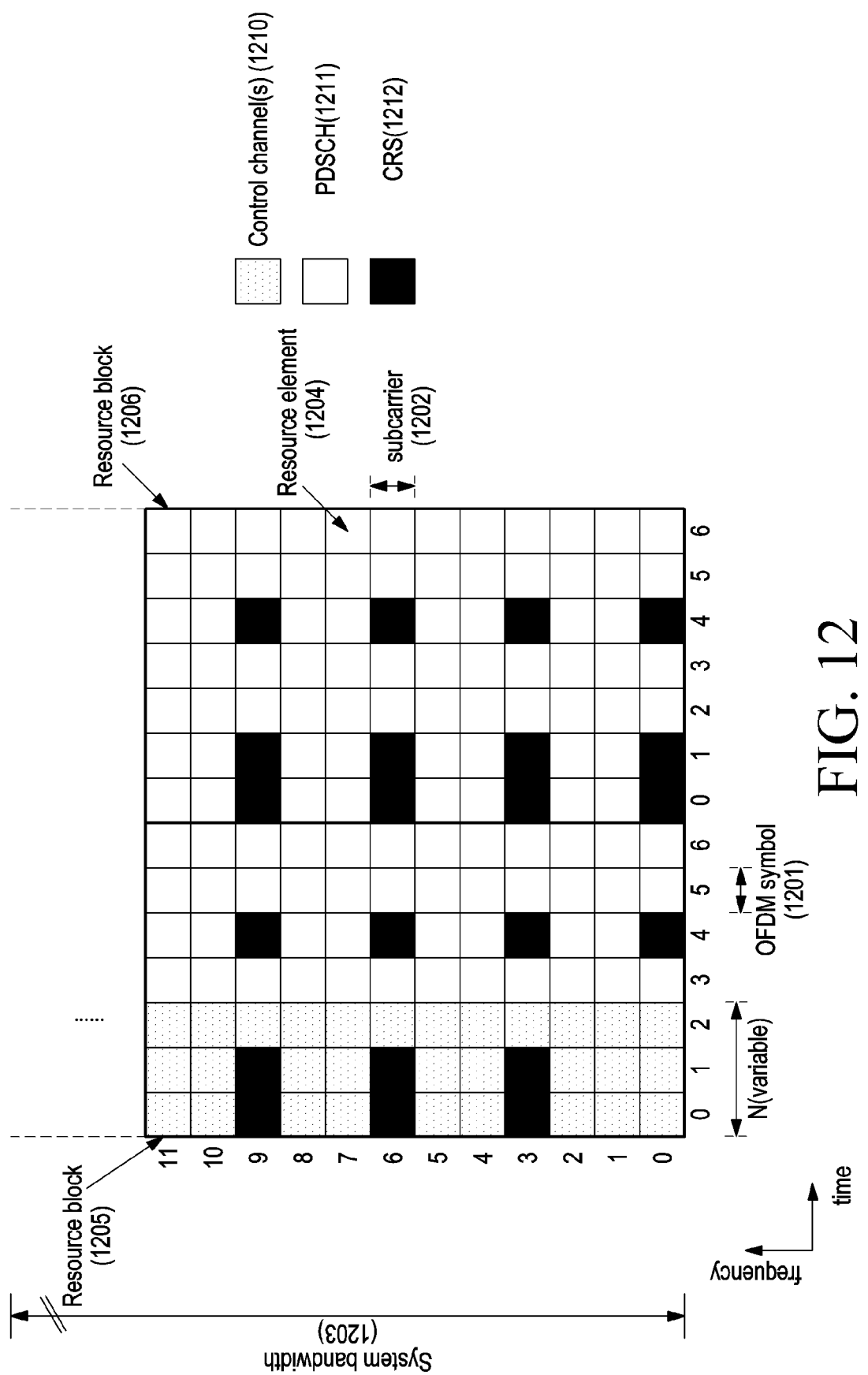
FIG. 12 is a diagram illustrating the basic structure of a time-frequency resource area in an LTE system according to an embodiment of the disclosure.

FIG. 12 is a diagram illustrating the basic structure of a time-frequency resource area of the LTE system according to an embodiment of the disclosure. That is, FIG. 12 illustrates the basic structure of a time-frequency area being a radio resource area in which data or a control channel is transmitted on DL, and a mapping relationship between DL physical channels and signals in the LTE system.

Basically, the LTE system is similar to the 5G system described with reference to FIG. 1. Unlike the 5G system, however, the SCS is generally fixed to 15 kHz irrespective of frequency bands, and there are a control channel and a signal that fixedly occupy time-frequency resources in the LTE system.

Referring to FIG. 12, the horizontal axis represents the time domain, and the vertical axis represents the frequency domain. A minimum transmission unit in the time domain is an OFDM symbol 1201, one slot includes $N_{symb}^{DL}$ OFDM symbols (generally $N_{symb}^{DL}=7$), and a 10-ms radio frame includes 10 subframes. A minimum transmission unit in the frequency domain is a subcarrier 1202, and a total system bandwidth 1203 may include $N_{BW}$ subcarriers in total. $N_{BW}$ may have a value proportional to a system transmission band. A basic resource unit in the time-frequency domain is an RE 1204, which may be represented by an OFDM symbol index and a subcarrier index. Each of RBs (or PRBs) 1205 and 1206 may be defined by $N_{symb}^{DL}$ consecutive OFDM symbols in the time domain and $N_{sc}^{RB}$ (generally, $N_{sc}^{RB}=12$) consecutive subcarriers in the frequency domain. Accordingly, one RB may include $N_{symb}^{DL} \times N_{sc}^{RB}$ REs.

LTE DL control channels 1210 may be mapped within first N OFDM symbols of a subframe in the time domain and over the entire system transmission band in the frequency domain, and transmitted to a terminal. The time-frequency area to which the LTE DL control channels are mapped may be referred to as a "control region". The base station may change the value of N for each subframe according to the amount of control information to be transmitted in the current subframe. In general, N={1, 2, 3}. The control channels may include a physical control format indicator channel (PCFICH) including an indicator indicating the value of N, a PDCCH including UL or DL scheduling information, and a physical HARQ indicator channel (PHICH) including an HARQ ACK/NACK signal indicating whether UL data has been successfully received. The PCFICH may be mapped to the first symbol among the first N OFDM symbols of the subframe, and the PDCCH may be mapped to the N OFDM symbols. The PHICH may be mapped across OFDM symbols based on a separate configuration indicated by the base station within the N OFDM symbols.

An LTE DL physical data channel, PDSCH 1211 may be mapped during the remaining subframe period in which the DL control channels are not transmitted in the time domain, and a frequency area indicated by the LTE PDCCH in the frequency domain, for transmission.

The base station may transmit a reference signal (RS) that the terminal refers to in measuring a DL channel state or demodulating the PDSCH. The RS is also called a pilot signal. RSs may be divided into a cell-specific reference signal (CRS) 1212 that terminals within a cell may commonly receive, a channel state information-reference signal (CSI-RS) that supports multiple antennas with relatively a small number of resources per antenna port, compared to the CRS, and a demodulation reference signal (DMRS) that the terminal refers to in demodulating a PDSCH scheduled for the terminal. In FIG. 12, only the CRS is shown for convenience.

A PDSCH DMRS may be mapped to preset positions in the time-frequency area of a PDSCH scheduled by the base station. For the CSI-RS, the base station may adjust a transmission periodicity and mapping positions in a time-frequency area. On the other hand, the CRS is characterized in that it is repeatedly mapped and transmitted to REs over the total system transmission band in every subframe, as illustrated in FIG. 12.

Antenna port is a logical concept, and an RS is defined for each antenna port and used for measuring a channel state for the antenna port. When the same RS is transmitted through multiple physical antennas, the terminal may recognize the antenna ports as one antenna port without distinguishing the physical antennas from each other.

The CRS is a cell-common signal, and the terminal may measure the CRS to perform the following operations.

1) The terminal determines a DL channel state from the CRS and then reports the DL channel state to the base station to support base station scheduling.

2) The terminal uses the CRS as an RS for demodulation of a PDSCH received from the base station.

3) The terminal determines whether a radio link between the base station and the terminal is maintained at or above a certain level.

4) The terminal supports handover determination of the base station by measuring the CRS of a neighbor cell and reporting the measurement to the base station.

Therefore, the base station may transmit the CRS at specified positions in every subframe irrespective of whether a PDSCH is transmitted to the terminal in the subframe.

As described above, there exists a need for a method of avoiding collision between LTE and 5G due to the LTE "control region" and the LTE CRS that often occupy time-frequency areas fixedly in the LTE system, when a 5G signal is transmitted through DSS. A method of avoiding collision between an LTE signal and a 5G signal in a DSS system will be described below with reference to FIG. 13.

Figure 13:
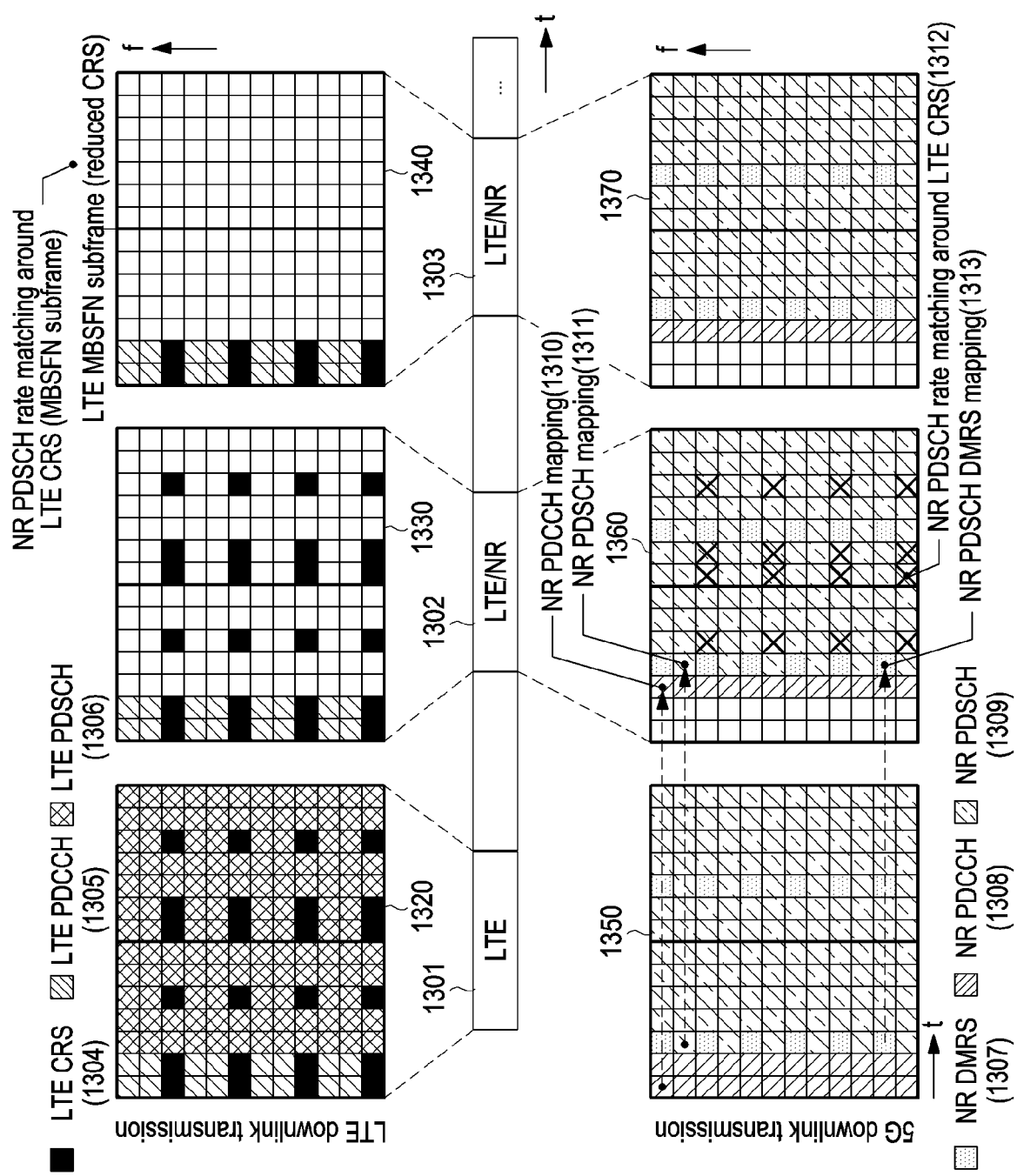
FIG. 13 is a diagram illustrating a method of avoiding collision between an LTE signal and a 5G signal in a dynamic spectrum sharing (DSS) system according to an embodiment of the disclosure.

FIG. 13 is a diagram illustrating a method of avoiding collision between an LTE signal and a 5G signal in a DSS system according to an embodiment of the disclosure.

Referring to FIG. 13, the horizontal axis represents the time domain, and the vertical axis represents the frequency domain. In the example of FIG. 13, it is assumed that the LTE system and the 5G system use the same frequency band and thus overlap with each other in the frequency domain. It is also assumed that both the LTE system and the 5G system use the same SCS of 15 kHz. For convenience of description, channels/signals of the LTE system and channels/signals of the 5G system may be distinguished from each other by adding "LTE" to the names of former and "NR" to the names of the latter. For example, a PDCCH for LTE may be referred to as an LTE PDCCH, and a PDCCH for 5G may be referred to as an NR PDCCH.

Reference numeral 1320 denotes the basic structure of a DL time-frequency area in the LTE system described with reference to FIG. 12, in which a base station transmits LTE DL signals during a time period 1301 (one subframe in LTE). The LTE DL signals may include an LTE CRS 1304, an LTE PDCCH 1305, and an LTE PDSCH 1306. The LTE PDCCH 1305 may include scheduling information for the LTE PDSCH 1306. In the structure 1320, an LTE "control region" is the first two symbols of a subframe, by way of example.

Reference numeral 1350 denotes the basic structure of a time-frequency area in the 5G system described with reference to FIG. 1, in which an NR PDCCH 1308, an NR PDSCH 1309, and an NR DMRS 1307 for the NR PDSCH are mapped. In the 5G time-frequency area (i.e., structure 1350), the NR PDCCH 1308 may be mapped to the first two symbols in a slot, and the NR PDSCH 1309 scheduled by the NR PDCCH 1308 may be mapped in the remaining period of the slot. In addition, the NR DMRS 1307 for the NR PDSCH 1309 may be mapped to the $3^{rd}$ symbol and the $10^{th}$ symbol of the slot.

In the example of FIG. 13, the base station may schedule an LTE PDSCH according to the structure 1320 and transmit the LTE PDS CH to an LTE terminal during the time period 1301. Referring to FIG. 13, there may be no signal transmitted from the base station to a 5G terminal during the time period 1301. During time periods 1302 and 1303, the NR PDSCH 1309 may be scheduled and transmitted to the 5G terminal according to structures 1360 and 1370, respectively. In addition, during the time periods 1302 and 1303, the base station may transmit an LTE CRS and an LTE PDCCH according to structures 1330 and 1340, respectively. In this case, there may be no LTE PDSCH transmission. Reference number 1340 denotes an LTE multimedia broadcast single frequency network (MBSFN) subframe, and the LTE MBSFN subframe 1340 has relatively small LTE CRS overhead, compared to the general subframes (i.e., structures 1320 and 1330).

1) Method 1 of avoiding collision between LTE signal and 5G signal: LTE CRS rate-matching In the DSS system, when transmitting a 5G DL signal to a 5G terminal, the base station maps and transmits the 5G DL signal, avoiding the positions of the LTE CRS (LTE CRS rate-matching). In addition, the base station indicates LTE CRS configuration information to the 5G terminal, so that the 5G terminal may receive the 5G DL signal at an accurate position. The LTE CRS configuration information may include at least part of the following information. The terminal may identify the mapping positions of the LTE CRS from the LTE CRS configuration information.

v-Shift (0, 1, 2, 3, 4, 5): A mapping offset of the LTE CRS from an RB boundary in the frequency domain, expressed in REs nrofCRS-Ports (1, 2, 4): The number of LTE CRS antenna ports carrierFreqDL (0 . . . 16383): The center frequency of an LTE carrier carrierBandwidthDL (6, 15, 25, 75, 100): An LTE carrier bandwidth, expressed in RBs mbsfn-SubframeConfigList (period, offset): LTE MBSFN subframe configuration information including the configuration period and timing offset of an LTE MBSFN subframe In the example of FIG. 13, when the base station has no DL data to be transmitted to an LTE terminal during the time period 1302, or when the base station determines that scheduling for a 5G terminal is prioritized during the time period 1302, the base station may allocate available radio resources to the 5G terminal. As described before, even though there is no LTE PDSCH to be transmitted to the LTE terminal during a specific LTE subframe period, the LTE CRS is mapped to predetermined positions and transmitted in the LTE system. Therefore, when the base station intends to provide a 5G service (e.g., NR PDSCH transmission) to the 5G terminal during the time period 1302, the base station maps an NR PDSCH to time-frequency resources other than the mapping positions of the LTE CRS and transmits the NR PDSCH. For example, areas 'x' indicated by reference numeral 1312 are REs in which the LTE CRS 1304 is transmitted in the structures 1320 and 1330, and the base station maps the NR PDSCH to areas other than the REs and transmits the NR PDSCH. Because the terminal needs to know the positions of the LTE CRS to receive the NR PDSCH except for the REs, the terminal obtains the LTE CRS configuration information from the base station by signaling.

2) Method 2 of avoiding collision between LTE signal and 5G signal: NR PDCCH mapping adjustment Time-frequency resources to which a 5G DL control channel, NR PDCCH is mapped may be referred to as a control resource set (CORESET). A CORESET may be configured in all or some frequency resources of a bandwidth supported by the terminal in the frequency domain. In the time domain, the CORESET may be configured in one or more OFDM symbols, which may be defined as a CORESET duration. The base station may configure one or more CORESETs for the terminal by higher-layer signaling (e.g., system information, an MIB, or RRC signaling). Configuring a CORESET for a terminal may mean providing information such as a CORESET ID, the frequency position of the CORESET, and the symbol duration of the CORESET. Information that the base station provides to the terminal to configure a CORESET may include at least part of information included in Table 4.

TABLE 4

```
ControlResourceSet ::=    SEQUENCE {
    controlResourceSetId    ,
        (CORESET ID)
    frequencyDomainResources    BIT STRING (SIZE (45)),
        (frequency-domain resources)
    duration                INTEGER (1..maxCoReSetDuration),
        (CORESET length)
    cce-REG-MappingType     CHOICE {
        (CCE-to-REG mapping type)
```

TABLE 4-continued

```
    interleaved          SEQUENCE {
       reg-BundleSize    ENUMERATED {n2, n3, n6},
                (REG bundle size)
                interleaverSize    ENUMERATED {n2, n3, n6},
                (interleaver size)
                shiftIndex
INTEGER(0..maxNrofPhysicalResourceBlocks-1)     OPTIONAL -- Need S
                (interleaver shift)
    },
    nonInterleaved       NULL
  },
  precoderGranularity            ENUMERATED   {sameAsREG-bundle,
allContiguousRBs},
       (precoding unit)
       tci-StatesPDCCH-ToAddList        SEQUENCE (SIZE  (1..maxNrofTCI-
StatesPDCCH)) OF TCI-StateId OPTIONAL, -- Cond NotSIB1-initialBWP
       (QCL configuration information)
    tci-StatesPDCCH-ToReleaseList    SEQUENCE(SIZE   (1..maxNrofTCI-
StatesPDCCH)) OF TCI-StateId OPTIONAL, -- Cond NotSIB1-initialBWP
       (QCL configuration information)
    tci-PresentInDCI       ENUMERATED {enabled{        OPTIONAL,
-- Need S
       (QCL indicator configuration information in DCI)
    pdcch-DMRS-ScramblingID                  INTEGER   (0..65535)
OPTIONAL, -- Need S
       (PDCCH DMRS scrambling ID)
}
```

A CORESET may include of $N_{RB}^{CORESET}$ RBs in the frequency domain and $N_{symb}^{CORESET}$ symbols where $N_{symb}^{CORESET} \in \{1, 2, 3\}$ in the time domain. The NR PDCCH may include one or more control channel elements (CCEs). One CCE may include six resource element groups (REGs), and an REG may be defined as one RB during one OFDM symbol. In one CORESET, REGs may be indexed in time-first order, starting with REG index 0 from the lowest RB in the first OFDM symbol of the CORESET.

In 5G, an interleaved scheme and a non-interleaved scheme may be supported to transmit the NR PDCCH. The base station may configure for the terminal whether to transmit the NR PDCCH in the interleaved or non-interleaved scheme on a CORESET basis by higher-layer signaling. Interleaving may be performed in units of an REG bundle. An REG bundle may be defined as a set of one or more REGs. The terminal may determine a CCE-to-REG mapping scheme for the CORESET based on the interleaved or non-interleaved scheme configured by the base station in the manner described in Table 5 below.

In the 5G system, the base station may indicate configuration information such as a symbol to which the NR PDCCH is mapped in a slot and a transmission period of the NR PDCCH to the terminal by signaling.

In the example of FIG. 13, in the structure 1350, the NR PDCCH 1308 may be mapped to the first two symbols in a slot, for transmission. During the time period 1302 in which LTE and 5G co-exist, the NR PDCCH may be mapped to the $3^{rd}$ symbol in a slot, avoiding time-frequency resources occupied by the LTE PDCCH and the LTE CRS, as indicated by reference numeral 1310 according to the structure 1360, thereby avoiding collision between LTE and 5G.

3) Method 3 of avoiding collision between LTE signal and 5G signal: position adjustment for NR PDS CH DMRS In the 5G system, the base station configures the mapping positions of the NR PDSCH DMRS and indicates the configured mapping positions to the terminal by signaling. For example, in the structure 1350 of FIG. 13, the NR PDSCH DMRS may be mapped to the $3^{rd}$ and $10^{th}$ symbols in a slot. During the time period 1302 in which LTE and 5G co-exist, the base station may map the NR PDSCH DMRS to the $4^{th}$ and $10^{th}$ symbols in a slot, avoiding the time-

TABLE 5

The CCE-to-REG mapping for a control-resource set can be interleaved or non-interleaved and is described by REG bundles:
- REG bundle i is defined as REGs $\{iL, iL + 1, ..., iL + L-1\}$ where L is the REG bundle size, $i = 0, 1, ..., N_{REG}^{CORESET} / L - 1$, and $N_{REG}^{CORESET} = N_{RB}^{CORESET} N_{symb}^{CORESET}$ is the number of REGs in the CORESET
- CCE j consists of REG bundles $\{f(6j/L), f(6j/L +1), ..., f(6j/L +6/L-1)\}$ where $f(\cdot)$ is an interleaver For non-interleaved CCE-to-REG mapping, L = 6 and f(x) = x.
For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by
$$f(x) = (rC + c + n_{shift}) \mod (N_{REG}^{CORESET} / L))$$
$$x = cR + r$$
$$r = 0, 1, ..., R - 1$$
$$c = 0, 1, ..., C - 1$$
$$C = N_{REG}^{CORESET}/(LR)$$
where $R \in \{2,3,6\}$.

frequency resources occupied by the LTE PDCCH and the LTE CRS, as indicated by reference numeral 1313 according to the structure 1360.

4) Method 4 of avoiding collision between LTE signal and 5G signal: NR PDSCH mapping adjustment In the 5G system, the base station indicates information about time-frequency resources of the NR PDSCH by an NR PDCCH that schedules the NR PDCCH.

For example, in the structure 1350 of FIG. 13, the NR PDSCH may be mapped to the $3^{rd}$ to $14^{th}$ symbols in a slot. During the time period 1302 in which LTE and 5G co-exist, the base station may map the NR PDSCH to the $4^{th}$ to $14^{th}$ symbols in a slot, avoiding the time-frequency resources occupied by the LTE PDCCH as indicated by reference numeral 1311 according to the structure 1360, thereby avoiding collision between LTE and 5G. Collision between the NR PDSCH and the LTE CRS may be avoided according to Method 1 of avoiding LTE-5G collision.

5) Method 5 of avoiding collision between LTE signal and 5G signal: LTE MBSFN subframe adjustment In the LTE system, a specific subframe may be configured as an MBSFN subframe (LTE MBSFN subframe) to decrease the mapping frequency of the LTE CRS within the LTE MBSFN subframe and limit the time-domain size of the LTE "control region". That is, symbols to which the LTE CRS is mapped are limited to the first two or fewer symbols, and the time-domain size of the LTE "control region" may be limited to the first two or fewer symbols in the LTE MBSFN subframe. Reference numeral 1340 denotes a time period 1303 configured as an LTE MBSFN subframe of the LTE system. Therefore, for the co-existence between LTE and 5G in the time period 1303, the 5G signal has only to be mapped, avoiding the LTE CRS and LTE "control region" mapped to the first two symbols of the LTE MBSFN subframe. That is, according to the structure 1370, the NR PDCCH may be mapped to the $3^{rd}$ symbol in a slot, avoiding time-frequency resources occupied by the LTE PDCCH, the NR PDSCH DMRS may be mapped to the $4^{th}$ and $10^{th}$ symbols in the slot, and the NR PDSCH may be mapped to the $4^{th}$ to $14^{th}$ symbols in the slot, thereby avoiding collision between the LTE signal and the 5G signal.

6) Method 6 of avoiding collision between LTE signal and 5G signal: 5G UL transmission frequency shift Unless there is a separate configuration, the frequency-domain mapping of a 5G UL signal is misaligned with the frequency-domain mapping of an LTE UL signal by a half of an SCS based on the SCS of 15 kHz. Therefore, for the co-existence between an LTE signal and a 5G signal on UL during the time periods 1302 and 1303 of FIG. 13, the frequency-domain mapping of the 5G UL signal may be shifted by a half (=7.5 kHz) of the SCS. The base station indicates to the terminal that the mapping of the UL signal is shifted by 7.5 kHz in the frequency domain by signaling.

Because LTE and 5G share time-frequency resources in the DSS system, excessively large 5G traffic may cause a lack of radio resources for scheduling an LTE terminal and hence a scheduling restriction. On the contrary, excessively large LTE traffic may cause a lack of radio resources for scheduling a 5G terminal and hence a scheduling restriction. Particularly due to the restrictions of the NR PDCCH resource mapping scheme, radio resources for the NR PDCCH may be relatively insufficient, compared to the NR PDSCH.

To overcome scheduling restrictions imposed on a 5G terminal, a method of applying 5G CA to a cell to which DSS is applied (hereinafter, referred to as a DSS cell for convenience of description) and a 5G cell, and then cross-carrier scheduling the DSS cell by the 5G cell will be described below.

Embodiment 1

According to Embodiment 1, a method of monitoring an NR PDCCH by a terminal, when a DSS cell and a 5G cell are aggregated, and the 5G cell cross-carrier schedules the DSS cell will be described.

First, an NR PDCCH search space will be described below. The number of CCEs required to transmit an NR PDCCH may be 1, 2, 4, 8, or 16 according to an aggregation level (AL), and different numbers of CCEs may be used for link adaptation of a DL control channel. For example, when AL=L, one DL control channel may be transmitted in L CCEs. Without information about the DL control channel, the terminal detects a signal, which is so-called blind decoding. For the blind decoding, a search space being a set of CCEs may be defined. The search space is a set of DL control channel candidates including CCEs that the terminal should attempt to decode at a given AL. There are various ALs at which 1, 2, 4, 8, and 16 CCEs are bundled, and thus the terminal may have a plurality of search spaces. A search space set may be defined as a set of search spaces for all configured ALs.

Search spaces may be classified into a common search space (CSS) and a UE-specific search space (USS). A certain group of terminals or all terminals may monitor the CSS of an NR PDCCH to receive cell-common control information such as dynamic scheduling of system information (an SIB) or a paging message. For example, the terminal may receive scheduling assignment information about an NR PDSCH for system information reception by monitoring the CSS of the NR PDCCH. Since a certain group of terminals or all terminals should receive the NR PDCCH, the CSS of the NR PDCCH may be defined as a set of preset CCEs. The terminal may receive scheduling assignment information about a terminal-specific NR PDSCH or NR PUSCH by monitoring an USS of the NR PDCCH. The USS may be terminal-specifically defined by a function of a terminal ID and various system parameters.

In the 5G system, the base station may configure configuration information about a search space of an NR PDCCH for the terminal by higher-layer signaling (e.g., an SIB, an MIB, or RRC signaling). For example, the base station may configure the terminal with the number of NR PDCCH candidate groups for each AL L, the monitoring periodicity of a search space, a monitoring occasion in each symbol of a slot for the search space, a search space type (CSS or USS), a combination of a DCI format and a radio network temporary identifier (RNTI) to be monitored in the search space, and a CORESET index to be monitored in the search space. For example, parameters for an NR PDCCH search space may include information described in Table 6 below.

TABLE 6

SearchSpace ::=    SEQUENCE {
searchSpaceId         ,
(search space ID)

TABLE 6-continued

```
controlResourceSetId           OPTIONAL,    -- Cond SetupOnly
    (CORESET ID)
monitoringSlotPeriodicityAndOffset CHOICE {
    (monitoring periodicity and offset in slot level)
    sl1                NULL,
    sl2                INTEGER (0..1),
    sl4                INTEGER (0..3),
    sl5                INTEGER (0..4),
    sl8                INTEGER (0..7),
    sl10               INTEGER (0..9),
    sl16               INTEGER (0..15),
    sl20               INTEGER (0..19),
    sl40               INTEGER (0..39),
    sl80               INTEGER (0..79),
    sl160              INTEGER (0..159),
    sl320              INTEGER (0..319),
    sl640              INTEGER (0..639),
    sl1280             INTEGER (0..1279),
    sl2560             INTEGER (0..2559)
}                              OPTIONAL,    -- Cond Setup
duration           INTEGER (2..2559)        OPTIONAL,    --
Need R
    (monitoring length)
monitoringSymbolsWithinSlot    BIT   STRING   (SIZE   (14))
OPTIONAL,   -- Cond Setup
    (positions of monitoring symbols in slot)
nrofCandidates      SEQUENCE {
    (number of PDCCH candidate groups for each AL)
    aggregationLevel1      ENUMERATED {n0, n1, n2, n3, n4, n5, n6, n8},
    aggregationLevel2      ENUMERATED {n0, n1, n2, n3, n4, n5, n6, n8},
    aggregationLevel4      ENUMERATED {n0, n1, n2, n3, n4, n5, n6, n8},
    aggregationLevel8      ENUMERATED {n0, n1, n2, n3, n4, n5, n6, n8},
    aggregationLevel16     ENUMERATED {n0, n1, n2, n3, n4, n5, n6, n8}
}                              OPTIONAL,   -- Cond Setup
searchSpaceType     CHOICE {
    (search space type)
    common              SEQUENCE {
        (common search space)
        dci-Format0-0-AndFormat1-0    SEQUENCE {
            ...
        }                          OPTIONAL,   -- Need R
        dci-Format2-0           SEQUENCE {
            nrofCandidates-SFI          SEQUENCE {
                aggregationLevel1      ENUMERATED{n1, n2}    OPTIONAL,
-- Need R
                aggregationLevel2      ENUMERATED {n1, n2}   OPTIONAL,
-- Need R
                aggregationLevel4      ENUMERATED {n1, n2}   OPTIONAL,
-- Need R
                aggregationLevel8      ENUMERATED {n1, n2}   OPTIONAL,
-- Need R
                aggregationLevel16     ENUMERATED {n1, n2}   OPTIONAL
-- Need R
            },
            ...
        }                          OPTIONAL,   -- Need R
        dci-Format2-1          SEQUENCE {
            ...
        }                          OPTIONAL,   -- Need R
        dci-Format2-2          SEQUENCE {
            ...
        }                          OPTIONAL,   -- Need R
        dci-Format2-3          SEQUENCE {
            dummy1                 ENUMERATED {sl1, sl2, sl4, sl5, sl8, sl10,
sl16, sl20} OPTIONAL,   -- Cond Setup
            dummy2                 ENUMERATED {n1, n2},
            ...
        }                          OPTIONAL    -- Need R
    },
    ue-Specific         SEQUENCE {
        (UE-specific search space)
        dci-Formats         ENUMERATED {formats0-0-And-1-0, formats0-
1-And-1 -1 },
        ...,
    }
}                               OPTIONAL    -- Cond Setup2
}
```

According to the configuration information, the base station may configure one or more search space sets for the terminal. According to some embodiments, the base station may configure search space set 1 and search space set 2 for the terminal. In search space set 1, the terminal may be configured to monitor DCI format A scrambled with an X-RNTI in a CSS, and in search space set 2, the terminal may be configured to monitor DCI format B scrambled with a Y-RNTI in an USS.

According to the configuration information, one or more search space sets may exist in the CSS or the USS. For example, search space set #1 and search space set #2 may be configured as the CSS, and search space set #3 and search space set #4 may be configured as the USS.

In the CSS, the terminal may monitor, but not limited to, the following DCI format and RNTI combinations.

DCI format 0_0/1_0 with cyclic redundancy check (CRC) scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the USS, the terminal may monitor, but not limited to, the following DCI format and RNTI combinations. Of course, it is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The above RNTIs may be defined and used as follows.

Cell RNTI (C-RNTI): terminal-specific PDSCH or PUSCH scheduling

Temporary Cell RNTI (TC-RNTI): terminal-specific PDSCH scheduling

Configured Scheduling RNTI (CS-RNTI): Semi-statically configured terminal-specific PDSCH scheduling Random Access RNTI (RA-RNTI): PDSCH scheduling in the random access stage Paging RNTI (P-RNTI): PDSCH scheduling for paging transmission System Information RNTI (SI-RNTI): PDSCH scheduling for system information transmission Interruption RNTI (INT-RNTI): To indicate whether PDSCH is punctured Transmit Power Control for PUSCH RNTI (TPC-PUSCH-RNTI): To indicate power control command for PUSCH Transmit Power Control for PUCCH RNTI (TPC-PUCCH-RNTI): To indicate power control command for PUCCH Transmit Power Control for SRS RNTI (TPC-SRS-RNTI): To indicate power control command for SRS The above-described DCI formats may follow the definitions shown in Table 7 below.

TABLE 7

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |

TABLE 7-continued

| DCI format | Usage |
| --- | --- |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space for an AL L in a CORESET p and a search space set s may be expressed by the following Equation.

$$L \cdot \left\{ \left( Y_{p,n_{s,f}^\mu} + \left\lfloor \frac{m_{s,n_{CI}} \cdot N_{CCE,p}}{L \cdot M_{p,s,\max}^{(L)}} \right\rfloor + n_{CI} \right) \bmod \lfloor N_{CCE,p}/L \rfloor \right\} + i \quad \text{Equation 1}$$

L: Aggregation level nCI: Carrier index $N_{CCE,p}$: Total number of CCEs included in the CORESET p $n^\mu_{s,f}$: Slot index $M^{(L)}_{p,s,max}$: Number of PDCCH candidate groups for AL L $m_{snCI}=0, \ldots, M^{(L)}_{p,s,max}-1$: PDCCH candidate group indexes for AL L i=0, . . . , L−1

$Y_{p,n_{s,f}^\mu} = (A_o \cdot Y_{p,n_{s,f}^\mu}) \bmod D$, $Y_{p,-1} = n_{RNTI} \neq 0$, $A_0=39827$, $A_1=39829$, $A_2=39839$, $D=65537$ $n_{RNTI}$: terminal ID The value of $Y_{p,n_{s,f}^\mu}$ may correspond to 0 in the CSS.

The $Y_{p,n_{s,f}^\mu}$ value may correspond to a value changed according to a terminal ID (a C-RNTI or an ID configured for the terminal by the base station) and a time index in the USS.

Figure 14:
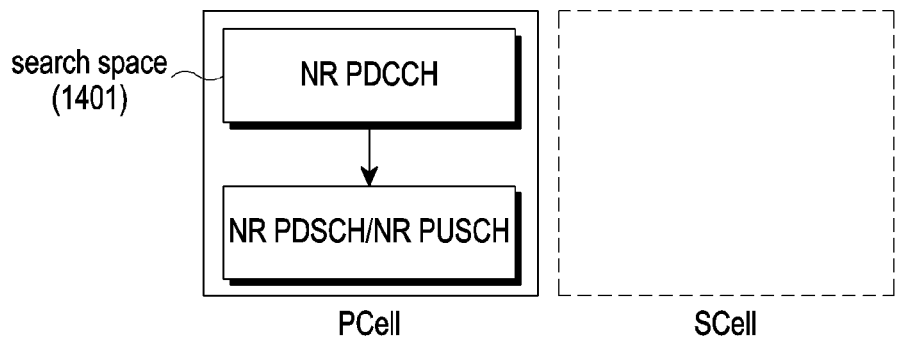
FIG. 14 is a diagram illustrating a search space after initial access of a terminal in a wireless communication system according to an embodiment of the disclosure.
Figure 15:
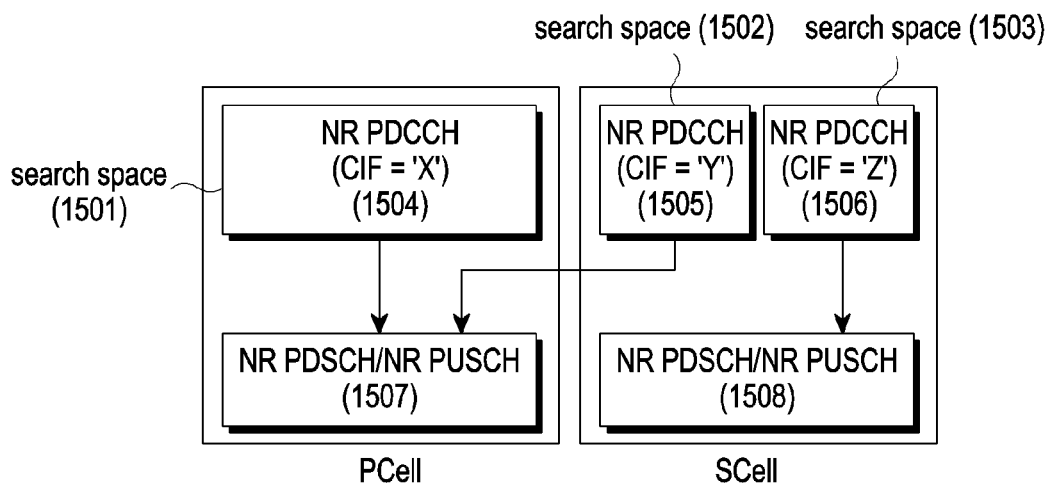
FIG. 15 is a diagram illustrating new radio access technology (NR) physical downlink control channel (PDCCH) search spaces in a wireless communication system according to an embodiment of the disclosure.
Figure 16:
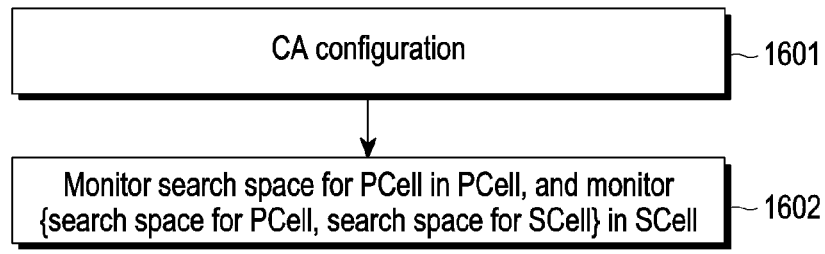
FIG. 16 is a flowchart illustrating a method of monitoring an NR PDCCH search space by a terminal in a wireless communication system according to an embodiment of the disclosure.

With reference to FIGS. 14, 15, and 16, a description will be given of a method of configuring a search space for an NR PDCCH and enabling a terminal to receive an NR PDCCH in the search space, when a DSS cell and a 5G cell are aggregated and the 5G cell (SCell) cross-carrier schedules the DSS cell (PCell), which is the subject matter of Embodiment 1.

In the examples of FIGS. 14, 15, and 16, a relationship indicating whether a cell in which a search space of an NR PDCCH scheduling a specific NR PDSCH/NR PUSCH is disposed is a PCell or an SCell may be marked with an arrow. For example, the starting point of the arrow indicates the cell in which the search space of the NR PDCCH is disposed, and the ending point of the arrow indicates a cell in which the NR PDSCH/NR PUSCH scheduled by the NR PDCCH is transmitted. In Embodiment 1, it is assumed that the 5G terminal recognizes a DSS cell as a PCell by connecting to the DSS cell through initial access, and then additionally configures a 5G cell as an SCell.

FIG. 14 is a diagram illustrating a search space after initial access of a terminal in a wireless communication system according to an embodiment of the disclosure.

Referring to FIG. 14 a 5G terminal connects to a DSS cell (PCell) through initial access and configures an NR PDCCH search space 1401 in the DSS cell is illustrated. The NR PDCCH search space may include a CSS and an USS. Referring to FIG. 14, there is no search space for the SCell because the SCell has not yet been additionally configured.

FIG. 15 is a diagram illustrating a method of configuring an NR PDCCH search space, when an SCell is additionally configured for a terminal, and the SCell cross-carrier schedules a PCell according to an embodiment of the disclosure.

Referring to FIG. 15, as described above, since a CSS is used for scheduling system information or a paging message, it is preferable to dispose and operate the CSS in the PCell. Accordingly, in Embodiment 1, even though the PCell is preconfigured to be cross-carrier scheduled, a CSS (i.e., USS 1501) of the PCell may be disposed in the PCell (i.e., the DSS cell). An USS 1502 of the PCell may be moved to the SCell to overcome the afore-mentioned problem of insufficient radio resources for the NR PDCCH in the DSS cell (PCell). Accordingly, there is no longer the USS for the PCell in the PCell. A search space 1503 for scheduling the SCell is disposed in the SCell.

In a modification example of Embodiment 1, some of the search spaces of the PCell may still be maintained in the PCell, simultaneously with the shift of a search space of the PCell to the SCell. For example, the PCell maintains a CSS and an USS 1501 for scheduling the PCell, and the USS 1502 for cross-carrier scheduling the PCell and the search space 1503 for self-carrier scheduling the SCell are disposed in the SCell. Accordingly, even though either the radio link of the PCell or the radio link of the SCell is unstable, the base station may characteristically transmit an NR PDCCH for the PCell in the search space of the other stable radio link.

Various modifications may be made to the above-described NR PDCCH search space configuration. For example, a search space configuration and CORESET configuration for the PCell, monitored in the SCell by the terminal may be implemented in the following various manners.

Method 1 of configuring search space and CORESET for PCell in SCell: A search space configuration and CORESET configuration for the PCell, monitored in the SCell by the terminal follow an USS configuration and CORESET configuration for the SCell, respectively.

Method 2 of configuring search space and CORESET for PCell in SCell: Offsets from the USS configuration and CORESET configuration for the SCell are applied to the search space configuration and CORESET configuration for the PCell, monitored in the SCell by the terminal, respectively. The base station indicates the offsets to the terminal by signaling.

Method 3 of configuring search space and CORESET for PCell in SCell: The search space configuration and CORESET configuration for the PCell, monitored in the SCell by the terminal are independent of the USS configuration and CORESET configuration for the SCell, respectively. Accordingly, the base station indicates the search space configuration and CORESET configuration for the PCell, monitored in the SCell by the terminal to the terminal by signaling.

Method 4 of configuring search space and CORESET for PCell in SCell: The base station indicates which one to be used among Methods 1, 2, and 3 of configuring a search space and a CORESET for a PCell to the terminal by signaling.

Regarding the NR PDCCH search spaces configured as illustrated in FIG. 15, there is a need for a method of identifying a cell carrying an NR PDSCH/NR PUSCH scheduled by an NR PDCCH received from the base station by a terminal. For example, referring to FIG. 15, there is a need for a method of distinguishing cells carrying an NR PDSCH/PUSCH scheduled by an NR PDCCH 1504 obtained by monitoring the NR PDCCH search space (i.e., USS 1501) of the PCell, an NR PDCCH 1505 obtained by monitoring the NR PDCCH search space 1502 of the SCell, and an NR PDCCH 1506 obtained by monitoring the NR PDCCH search space 1503 of the SCell. Accordingly, in the disclosure, the base station transmits an NR PDCCH including a carrier indicator field (CIF) to the terminal, and the terminal identifies a cell carrying an NR PDSCH/PUSCH scheduled by the NR PDCCH from information about a cell in which an NR PDCCH search space is configured and the CIF of the NR PDCCH. The information about the cell in which the NR PDCCH search space is configured may be a cell index (or carrier index), information about a frequency to which the NR PDCCH is mapped, or a search space index. Accordingly, the cell carrying the NR PDSCH/NR PUSCH scheduled by the NR PDCCH may be generalized to the following Equation.

Information about cell carrying NR PDSCH/NR PUSCH scheduled by NR PDCCH=$f$(CIF, information about cell in which NR PDCCH search space is configured)   Equation 2

In the above Equation, the function $f(\cdot)$ is a generalized function for calculating cell information from an input parameter.

A method of determining information about a cell carrying an NR PDSCH/NR PUSCH scheduled by an NR PDCCH in a CA environment will be described below in detail. Referring to FIG. 15 for convenience of description, it is assumed that the NR PDCCH 1504 transmitted in the NR PDCCH search space (i.e., 1501) of the PCell includes CIF='X', the NR PDCCH 1505 transmitted in the NR PDCCH search space 1502 of the SCell includes CIF='Y', and the NR PDCCH 1506 transmitted in the NR PDCCH search space 1503 of the SCell includes CIF='Z'.

Method 1 of determining cell carrying NR PDSCH/NR PUSCH: In Method 1, a CIF is included in an NR PDCCH regardless of whether a cell carrying the NR PDCCH is a PCell or an SCell. Even though cells carrying the NR PDCCHs 1504 and 1505 are different, when NR PDSCHs/NR PUSCHs 1507 scheduled by the NR PDCCHs are transmitted in the same cell, the CIF values of the NR PDCCHs are set equal (X=Y). In addition, although the NR PDCCH 1505 and the NR PDCCH 1506 are transmitted in the same SCell, the values of the CIFs of the NR PDCCH 1505 and the NR PDCCH 1506 are set to different values (Y≠Z) to distinguish schedulings of the NR PDSCH/NR PUSCH 1507 and the NR PDSCH/NR PUSCH 1508 transmitted in different cells.

In the example of FIG. 15, CIF (X, Y, Z) may be set to (0, 0, 1), respectively in Method 1. That is, since all of the cells carrying the NR PDSCHs/NR PUSCHs 1507 scheduled by the NR PDCCH 1504 and the NR PDCCH 1505 are equally the PCell, the CIF values are set to X=Y. Additionally, the value of the CIF for the PCell is set to '0' and thus X=Y=0. The PCell is a basic cell for the terminal and CIF=0 for the PCell, to give priority to the PCell over the SCell. In addition, since the cell carrying the NR PDSCH/NR PUSCH 1508 scheduled by the NR PDCCH 1506 is the SCell, not the PCell, Z=1 as a CIF value different from the CIF value for the PCell. The terminal determines from the CIF values of the NR PDCCHs 1504, 1505, and 1506 that the NR PDCCHs 1504 and 1505 with CIF='0' schedule the NR PDSCHs/NR PUSCHs 1507, and the NR PDCCH 1506 with CIF='1' schedules the NR PDSCH/NR PUSCH 1508. Since search spaces for the NR PDCCH 1504 and the NR PDCCH 1505 are separately in the PCell and the SCell, respectively, the terminal may distinguish the search spaces from each other.

Method 2 of determining cell carrying NR PDSCH/NR PUSCH: In Method 2, a CIF is included in an NR PDCCH regardless of whether a cell carrying the NR PDCCH is a PCell or an SCell. When different cells carry the NR PDCCHs 1504 and 1505, and the NR PDSCHs/NR PUSCHs 1507 scheduled by the NR PDCCHs 1504 and 1505 are transmitted in the same cell, the values of the CIFs of the NR PDCCHs 1504 and 1505 are set to different values (X≠Y). Further, although the NR PDCCH 1505 and the NR PDCCH 1506 are transmitted in the same SCell, the values of the CIFs of the NR PDCCH 1505 and the NR PDCCH 1506 are set to different values (Y≠Z) to distinguish schedulings of the NR PDSCHs/NR PUSCHs 1507 and 1508 transmitted in different cells.

In the example of FIG. 15, CIFs (X, Y, Z) may be set to (0, 1, 0), respectively in Method 2. That is, while the cells carrying the NR PDCCH 1504 and the NR PDCCH 1505 are the PCell and the SCell different from each other, the NR PDSCHs/NR PUSCHs 1507 scheduled by the NR PDCCH 1504 and the NR PDCCH 1505 are transmitted in the same cell, the PCell. Therefore, the values of the CIFs of the NR PDCCH 1504 and the NR PDCCH 1505 are set to different values X≠Y). Additionally, for a PDCCH transmitted in the PCell, its CIF value is set to '0', and thus X=0 and Y=1 in this case. The PCell is a basic cell for the terminal, and the value of the CIF of an NR PDCCH transmitted in the PCell is set to 0 (CIF X=0), to give priority to the PCell over the SCell. Further, although the NR PDCCH 1505 and the NR PDCCH 1506 are transmitted in the same SCell, the values of the CIFs of the NR PDCCH 1505 and the NR PDCCH 1506 are set to different values (Y≠W, Y=1, Z=0) to distinguish schedulings of the NR PDSCHs/NR PUSCHs 1507 and 1507 transmitted in different cells from each other.

Regarding the received NR PDCCHs 1504, 1505, and 1506, the terminal determines that the NR PDCCH 1504 received in the PCell schedules the NR PDSCH/NR PUSCH 1507 in the PCell. In an embodiment, when the CIF is configured for NR PDCCH 1505 and the UE is configured for cross-carrier scheduling from the SCell to the PCell, the UE may ignore CIF (or CIF value) of NR PDCCH 1505 and identify that the NR PDCCH 1504 (or DCI on the NR PDCCH 1504) schedules the NR PDSCH/NR PUSCH 1507 on the PCell. Further, the terminal determines from the CIF values of the NR PDCCHs 1505 and 1506 received in the SCell that the NR PDCCH 1505 with CIF='1' schedules the NR PDSCH/NR PUSCH 1507 of the PCell, and the NR PDCCH 1506 with CIF='0' schedules the NR PDSCH/NR PUSCH 1508 of the SCell, according to pre-agreement.

Method 3 of determining cell carrying NR PDSCH/NR PUSCH: In Method 3, when a cell carrying an NR PDCCH is an SCell, a CIF is included in the NR PDCCH. When the NR PDCCH is transmitted in a PCell, the CIF is not included in the NR PDCCH (X=NULL). Although the NR PDCCH 1505 and the NR PDCCH 1506 are transmitted in the SCell, the values of the CIFs of the NR PDCCH 1505 and the NR PDCCH 1506 are set to different values (Y≠Z) to distinguish schedulings of the NR PDSCH/NR PUSCH 1507 and 1508 transmitted in different cells from each other.

In the example of FIG. 15, CIFs (X, Y, Z) may be set to (NULL, 0, 1), respectively in Method 3. According to the above CIF configuration, regarding the received NR PDCCH 1504, NR PDCCH 1505, and NR PDCCH 1506, the terminal determines that the NR PDCCH 1504 received from the PCell schedules the NR PDSCH/NR PUSCH 1507 of the PCell. Further, the terminal determines from the CIF values of the NR PDCCHs 1505 and 1506 received in the SCell that the NR PDCCH 1505 with CIF='0' schedules the NR PDSCH/NR PUSCH 1507 of the PCell, and the NR PDCCH 1506 with CIF='1' schedules the NR PDSCH/NR PUSCH 1508 of the SCell, according to pre-agreement.

Method 4 of determining cell carrying NR PDSCH/NR PUSCH: In Method 4, CIFs are included in the NR PDCCHs 1504 and 1505 that schedule the NR PDSCHs/NR PUSCHs 1507 in the PCell. A CIF is not included in the NR PDCCH 1506 scheduling the NR PDSCH/NR PUSCH 1508 of the SCell (Z=NULL). The values of the CIFs of the NR PDCCH 1504 and the NR PDCCH 1505 are set to different CIF values (X≠Y) to distinguish scheduled cells from each other. Alternatively, the values of the CIFs of the NR PDCCH 1504 and the NR PDCCH 1505 may be set to the same value (X=Y). In this case, since the NR PDCCH search spaces (i.e., USS 1501 and 1502) are separately in the PCell and the SCell, respectively, cells scheduled by the NR PDCCHs (i.e., USS 1501 and 1502) may be distinguished from each other in spite of the same CIF value (X=Y).

In the example of 15, CIFs (X, Y, Z) may be set to (0, 0, NULL), respectively in Method 4. The terminal determines that the NR PDCCHs 1504 and 1505 schedule the NR PDSCHs/NR PUSCHs 1507 from the CIF values of the NR PDCCH 1504 and the NR PDCCH 1505 and information about the cells to which the search spaces belong. Further, the terminal determines that the NR PDCCH 1506 schedules the NR PDSCH/NR PUSCH 1508 from the CIF configuration (NULL) and the search space of the NR PDCCH 1506.

Method 5 of determining cell carrying NR PDSCH/NR PUSCH: In Method 5, the base station determines a method to be applied among Method 1 to Method 4 and indicates the determined method to the terminal by signaling.

In the above-described Method 1 to Method 5, the search space 1502 of the NR PDCCH 1505 and the search space 1503 of the NR PDCCH 1506 in the SCell may be mapped independently to separate resource areas, or may be mapped by sharing all or some resources with each other.

The main points of Method 1 to Method 4 described above are summarized in Table 8 below.

TABLE 8

|  | CIF included? | CIF (X, Y, Z) | Example |
| --- | --- | --- | --- |
| Method 1 | Included in NR PDCCH regardless of cells | X = Y, Y ≠ Z | (0, 0, 1) |
| Method 2 | Included in NR PDCCH regardless of cells | X = Y, Y ≠ Z | (0, 1, 0), (0, 1, 2), (0, 2, 1) |
| Method 3 | Included in NR PDCCH transmitted in SCell | X = NULL, Y ≠ Z | (NULL, 0, 1), (NULL, 1, 0) |
| Method 4 | Included in NR PDCCH scheduling PCell | Z = NULL | (0, 0, NULL), (0, 1, NULL) |

FIG. 16 is a diagram illustrating a method of monitoring an NR PDCCH search space by a terminal in a wireless communication system according to an embodiment of the disclosure.

That is, FIG. 16 illustrates a procedure of monitoring an NR PDCCH by a terminal according to a method of configuring an NR PDCCH search space described with reference to FIG. 15.

Referring to FIG. 16, in operation 1601, the terminal receives a CA configuration from a base station. In an embodiment, the CA configuration may include a configuration in which an SCell cross-carrier schedules a PCell. For example, the configuration may include the following signaling.

1) Signaling 1: Indicates a PCell ID as information about the index of a scheduled cell in which an NR PDSCH/NR PUSCH scheduled by an NR PDCCH is transmitted, or 2) Signaling 2: Explicitly indicates that an SCell cross-carrier schedules a PCell.

When the terminal completes the CA configuration according to an indication from the base station, the terminal may perform NR PDCCH monitoring in operation 1602. For example, according to the NR PDCCH search space configuration, the terminal may monitor a search space for the PCell in the PCell and monitor {search space for PCell, search space for SCell} in the SCell. A search space configuration and CORESET configuration for the PCell monitored in the SCell by the terminal may follow a search space configuration and CORESET configuration for the SCell, or may follow independent configurations. In a subsequent operation, the terminal may receive an NR PDSCH or transmit an NR PUSCH according to scheduling from a successfully received NR PDCCH. Herein, the terminal determines a cell in which the NR PDSCH is to be received or a cell in which the NR PUSCH is to be transmitted according to the above-described 'method of determining cell carrying NR PDSCH/NR PUSCH'.

Various modifications may be made to Embodiment 1. For example, different CIF configurations may be applied by classifying NR PDCCH search spaces. A CIF may not be added to an NR PDCCH mapped to a CSS, whereas a CIF may be added to an NR PDCCH mapped to an USS. Accordingly, the NR PDCCH in the CSS has a uniform control information configuration regardless of whether CA is configured.

In another example, different CIF configurations may be applied by classifying DCI formats for an NR PDCCH. For example, a CIF may not be added to DCI format 0_0/1_0, and a CIF may be added to DCI format 0_1/1_1. Accordingly, DCI format 0_0/1_0 has a uniform control information configuration regardless of whether CA is configured.

Embodiment 2

In Embodiment 2, a description is given of a method of adaptively changing a cell carrying an NR PDCCH, when a DSS cell and a 5G cell are subjected to 5G CA, and the 5G cell cross-carrier schedules the DSS cell.

In the NR PDCCH search space configuration in which search spaces for a PCell exist in both the PCell and an SCell, an additional procedure related to an HARQ operation of an NR PDSCH/NR PUSCH in the PCell may be required. For example, an NR PDCCH that schedules an NR PDSCH of the PCell at a specific instant may be mapped to and transmitted in a search space for the PCell in the SCell, and an NR PDCCH that schedules an NR PDSCH of the PCell at another instant may be mapped to and transmitted in a search space for the PCell in the PCell (or vice versa).

Figure 17:
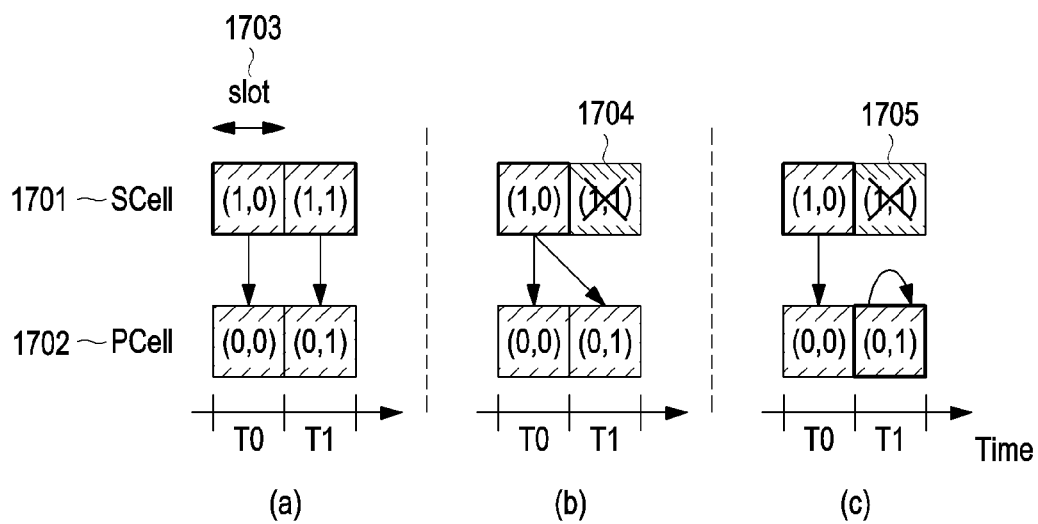
FIG. 17 is a diagram illustrating a method of transmitting an NR PDCCH in a wireless communication system according to an embodiment of the disclosure.

With reference to FIG. 17, Embodiment 2 will be described in detail.

FIG. 17 illustrates three methods A, B and C for cross-carrier scheduling a PCell by an SCell 1701 according to an embodiment of the disclosure.

Referring to FIG. 17, illustrates three methods A, B and C for cross-carrier scheduling a PCell 1702, the horizontal axis represents time, the starting point of an arrow represents a cell in which a search space of an NR PDCCH is located, and the ending point of the arrow represents a cell in which an NR PDSCH/PUSCH scheduled by the NR PDCCH is transmitted. While scheduling is performed in each slot 1703 for convenience of description, the disclosure is not limited to slot-level scheduling. Referring to FIG. 17, each slot of the PCell or the SCell is represented by (x, y) where x is a cell index and y is a slot index. When x=0, this means the PCell, and when x=1, this means the SCell. When y=0, this indicates slot 0, and when y=1, this indicates slot 1. The slot index increases with passage of time.

Method A: Method A is for a case in which there is no restriction in transmitting an NR PDCCH in the SCell that cross-carrier schedules the PCell. Therefore, in the case of part (a) of FIG. 17, an NR PDCCH is transmitted in slot (1,0) of the SCell during a time period T0 to schedule an NR PDSCH/NR PUSCH to be transmitted in slot (0,0) of the PCell corresponding in time to slot (1,0) of the SCell. Sequentially, an NR PDCCH is transmitted in slot (1, 1) of the SCell during a time period T1 to schedule an NR PDSCH/NR PUSCH to be transmitted in slot (0, 1) of the PCell corresponding in time to slot (1, 1) of the SCell. That is, both of slots (1, 0) and (1, 1) of the SCell secure DL radio resources enough to impose no restriction on NR PDCCH transmissions. For example, both of the slots (1, 0) and (1, 1) of the SCell may be DL slots. In Method A, the terminal monitors the NR PDCCH search spaces of the SCell over the time periods T0 and T1 to obtain the NR PDCCHs that schedule the PCell.

Method B: Method B is for a case where there is a restriction in transmitting an NR PDCCH in an SCell that cross-carrier schedules a PCell. Referring to part (b) of FIG. 17, slot (1, 1) 1704 of the SCell secures DL radio resources so insufficient as to impose a restriction on an NR PDCCH transmission. For example, slot (1, 1) 1704 of the SCell is shown as configured as a UL slot. Therefore, in the time period T0, an NR PDCCH transmitted in slot (1, 0) of the SCell cross-carrier schedules an NR PDSCH/NR PUSCH to be transmitted in slot (0, 0) of the PCell corresponding in time to slot (1, 0) of the SCell. Additionally, in Method B, an NR PDCCH transmitted in slot (1, 0) of the SCell in the time period T0 cross-carrier schedules an NR PDSCH/NR PUSCH to be transmitted in slot (0, 1) of the PCell in the time period T1. That is, since slot (1, 1) of the SCell corresponding in time to slot (0, 1) of the PCell is no longer available for transmission of an NR PDCCH, an NR PDCCH that cross-carrier-schedules the PCell is transmitted in slot (1, 0) (in the time period T0) preceding slot (0, 1) of the PCell (i.e., in the time period T1). Therefore, the use of the radio resources of the NR PDSCH/NR PUSCH transmitted in the PCell may be maximized. In Method B, the terminal monitors the corresponding NR PDCCH search space of the SCell in the time period T0 without monitoring the corresponding NR PDCCH search period of the SCell in the time period T1, to obtain the NR PDCCH scheduling the PCell.

Method C: Method C is for a case where there is a restriction in transmitting an NR PDCCH in an SCell that cross-carrier schedules a PCell. Referring to part (c) of FIG. 17, slot (1, 1) 1705 of the SCell secures DL radio resources so insufficient as to impose a restriction on transmission of an NR PDCCH. For example, slot (1, 1) 1705 of the SCell is configured as a UL slot. Therefore, an NR PDCCH transmitted in slot (1, 0) of the SCell in the time period T0 cross-carrier schedules an NR PDSCH/NR PUSCH to be transmitted in slot (0,0) of the PCell corresponding in time to slot (1, 0) of the SCell. Additionally, an NR PDCCH transmitted in slot (0, 1) of the PCell cross-carrier-schedules an NR PDSCH/NR PUSCH to be transmitted in slot (0, 1) of the PCell in the time period T1. That is, since an NR PDCCH transmission is no longer available in slot (1, 1) of the SCell corresponding in time to slot (0, 1) of the PCell in the time period T1, even though the PCell is preconfigured to be cross-carrier scheduled, an NR PDCCH that self-carrier schedules the PCell is exceptionally transmitted in slot (0, 1) of the PCell. Therefore, the effect of maximizing the use of the radio resources of an NR PDSCH/NR PUSCH transmitted in the PCell may be achieved. In Method C, to obtain an NR PDCCH that schedules the PCell, the terminal monitors a corresponding NR PDCCH search space of the SCell in the time period T0 (i.e., cross-carrier scheduling) and monitors a corresponding NR PDCCH of the PCell in the time period T1 (i.e., self-carrier scheduling). Switching between cross-carrier scheduling and self-carrier scheduling may be indicated to the terminal by explicit signaling from the base station, or may be autonomously determined by the terminal, when a certain condition such as a lack of DL radio resources in an SCell as in the example of FIG. 17 is satisfied.

For Method B and Method C described above, the base station includes at least the following information in an NR PDCCH that schedules a PCell to indicate a time at which an NR PDSCH/NR PUSCH is transmitted to the terminal.

Information about a cell carrying the NR PDSCH/NR PUSCH: for example, a cell index or a carrier index Information about a time when the NR PDSCH/NR PUSCH is transmitted: for example, a slot index or an NR PDCCH reference timing offset When there is a restriction on transmission of an NR PDCCH in an SCell that cross-carrier-schedules a PCell, the base station may select one of Method B and Method C and indicate the selected method to the terminal by signaling.

Compared to FIG. 17 illustrating a case where a PCell and an SCell to which CA is applied have the same SCS.

Figure 18:
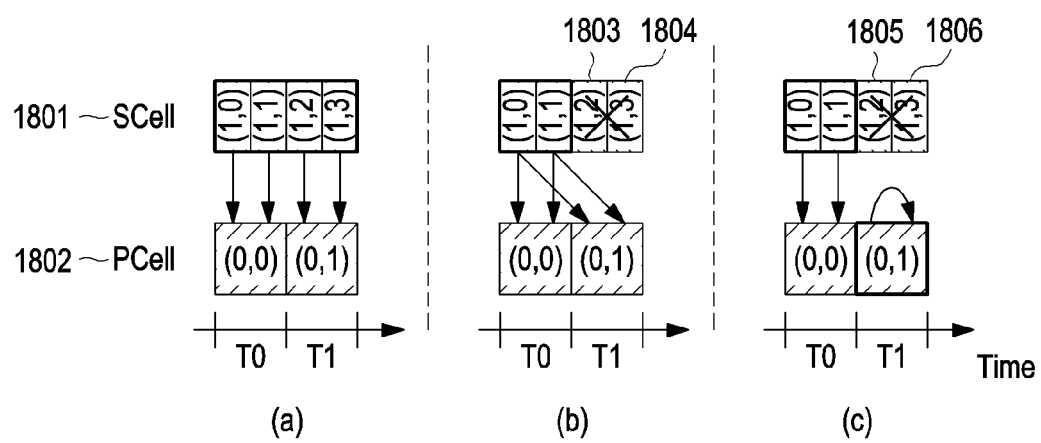
FIG. 18 is a diagram illustrating another method of transmitting an NR PDCCH in a wireless communication system according to an embodiment of the disclosure.

FIG. 18 illustrates a case where a PCell and an SCell to which CA is applied have different SCSs according to an embodiment of the disclosure.

Referring to FIG. 18, the PCell has an SCS of 15 kHz and the SCell has an SCS of 30 kHz. Therefore, in the illustrated case of FIG. 18, the slot duration of the PCell is larger than the slot duration of the SCell by the SCS difference. The basic operation of FIG. 18 is similar to that of FIG. 17.

Method A: Method A is for a case in which there is no restriction in transmitting an NR PDCCH in an SCell that cross-carrier schedules a PCell. Therefore, in the case of part (a) of FIG. 18, an NR PDCCH is transmitted in slot (1, 0) or slot (1, 1) of the SCell in the time period T0 to schedule an NR PDSCH/NR PUSCH to be transmitted in slot (0, 0) of the PCell corresponding in time to slot (1, 0) or slot (1, 1) of the SCell. Sequentially, an NR PDCCH is transmitted in slot (1, 2) or slot (1, 3) of the SCell in the time period T1 to schedule an NR PDSCH/NR PUSCH to be transmitted in slot (0, 1) of the PCell corresponding in time to slot (1, 2) or slot (1, 3) of the SCell. That is, all of slots (1, 0), (1, 1), (1, 2), and (1, 3) of the SCell secure DL radio resources enough to impose no restriction on NR PDCCH transmissions. For example, all of slots (1, 0), (1, 1), (1, 2), and (1, 3) of the SCell may be DL slots. However, the starting time of an NR PDCCH transmitted in the SCell should be at least identical to or earlier than the starting time of an NR PDSCH/NR PUSCH transmitted in the PCell (hereafter, referred to as 'Condition A' for convenience of description). For example, when the NR PDCCH transmitted in slot (1, 1) of the SCell is to schedule the NR PDSCH in slot (0, 0) of the PCell, the starting time of the NR PDSCH may not be earlier than the starting time of the NR PDCCH. This restriction may alleviate the processing complexity of the terminal.

In Method A, the terminal monitors corresponding NR PDCCH search spaces of the SCell over the time periods T0 and T1 to obtain the NR PDCCHs scheduling the PCell.

Method B: Method B is for a case where there is a restriction in transmitting an NR PDCCH in an SCell 1801 that cross-carrier schedules a PCell 1802. Referring to part (b) of FIG. 18, slot (1, 2) 1803/slot (1, 3) 1804 of the SCell secures DL radio resources so insufficient as to impose a restriction on an NR PDCCH transmission. For example, slot (1, 2) 1803/slot (1, 3) 1804 of the SCell is shown as configured as a UL slot. Therefore, the NR PDCCH transmitted in slot (1, 0) or slot (1, 1) of the SCell in the time period T0 cross-carrier schedules an NR PDSCH/NR PUSCH to be transmitted in slot (0, 0) of the PCell corresponding in time to slot (1, 0) or slot (1, 1) of the SCell. Additionally in Method B, the NR PDCCH transmitted in slot (1, 0) or slot (1, 1) of the SCell in the time period T0 cross-carrier schedules an NR PDSCH/NR PUSCH to be transmitted in slot (0, 1) of the PCell in the time period T1. That is, since slot (1, 2) or slot (1, 3) of the SCell corresponding in tie to slot (0, 1) of the PCell is no longer available for transmission of an NR PDCCH, an NR PDCCH that cross-carrier-schedules the PCell is transmitted in slot (1, 0) or slot (1, 1) (in the time period T0) preceding slot (0, 1) of the PCell (i.e., in the time period T1). Therefore, the use of the radio resources of the NR PDSCH/NR PUSCH transmitted in the PCell may be maximized. Like Method A, Method B should satisfy 'Condition A'. In Method B, the terminal monitors a corresponding NR PDCCH search space of the SCell in the time period T0 without monitoring a corresponding NR PDCCH search period of the SCell in the time period T1, to obtain an NR PDCCH scheduling the PCell.

Method C: Method C is for a case where there is a restriction in transmitting an NR PDCCH in an SCell that cross-carrier-schedules a PCell. Referring to part (c) of FIG. 18, slot (1, 2) 1805/slot (1, 3) 1806 of the SCell secures DL radio resources so insufficient as to impose a restriction on transmission of an NR PDCCH. For example, slot (1, 2) 1805/slot (1, 3) 1806 of the SCell is configured as a UL slot. Therefore, an NR PDCCH transmitted in slot (1, 0) or slot (1, 1) of the SCell in the time period T0 cross-carrier-schedules an NR PDSCH/NR PUSCH to be transmitted in slot (0, 0) of the PCell corresponding in time to slot (1, 0) or slot (1, 1) of the SCell. Additionally in Method C, an NR PDCCH transmitted in slot (0, 1) of the PCell crosscarrier-schedules an NR PDSCH/NR PUSCH to be transmitted in slot (0, 1) of the PCell in the time period T1. That is, since an NR PDCCH transmission is no longer available in slot (1, 2) or slot (1, 3) of the SCell corresponding in time to slot (0, 1) of the PCell in the time period T1, even though the PCell is preconfigured to be cross-carrier scheduled, an NR PDCCH that self-carrier schedules the PCell is exceptionally transmitted in slot (0, 1) of the PCell. Therefore, the effect of maximizing the use of the radio resources of an NR PDSCH/NR PUSCH transmitted in the PCell may be achieved. Like Method A, Method C should also satisfy 'Condition A'. In Method C, to obtain an NR PDCCH that schedules the PCell, the terminal monitors a corresponding NR PDCCH search space of the SCell in the time period T0 (i.e., cross-carrier scheduling) and monitors a corresponding NR PDCCH of the PCell in the time period T1 (i.e., self-carrier scheduling). Switching between cross-carrier scheduling and self-carrier scheduling may be indicated to the terminal by explicit signaling from the base station, or may be autonomously determined by the terminal, when a certain condition such as a lack of DL radio resources in an SCell as in the example of FIG. 18 is satisfied.

Various modifications may be made to Embodiment 2. For example, Method B or Method C may be applied by classifying NR PDCCH search spaces. That is, when there is a restriction in transmitting an NR PDCCH in an SCell that cross-carrier-schedules a PCell, Method B or Method C is applied to an USS, while no NR PDCCH transmission is performed in a CSS without a separate operation.

In another example, Method B or Method C may be applied by classifying DCI formats for an NR PDCCH. That is, when there is a restriction in transmitting an NR PDCCH in an SCell that cross-carrier-schedules a PCell, Method B or Method C is applied to DCI format 0_1/1_1, while no NR PDCCH transmission is performed in DCI format 0_0/1_0 without a separate operation.

Embodiment 3

In Embodiment 3, a description is given of a configuration method for subjecting a DSS cell and a 5G cell to 5G CA and cross-carrier scheduling the DSS cell by the 5G cell.

Figure 19:
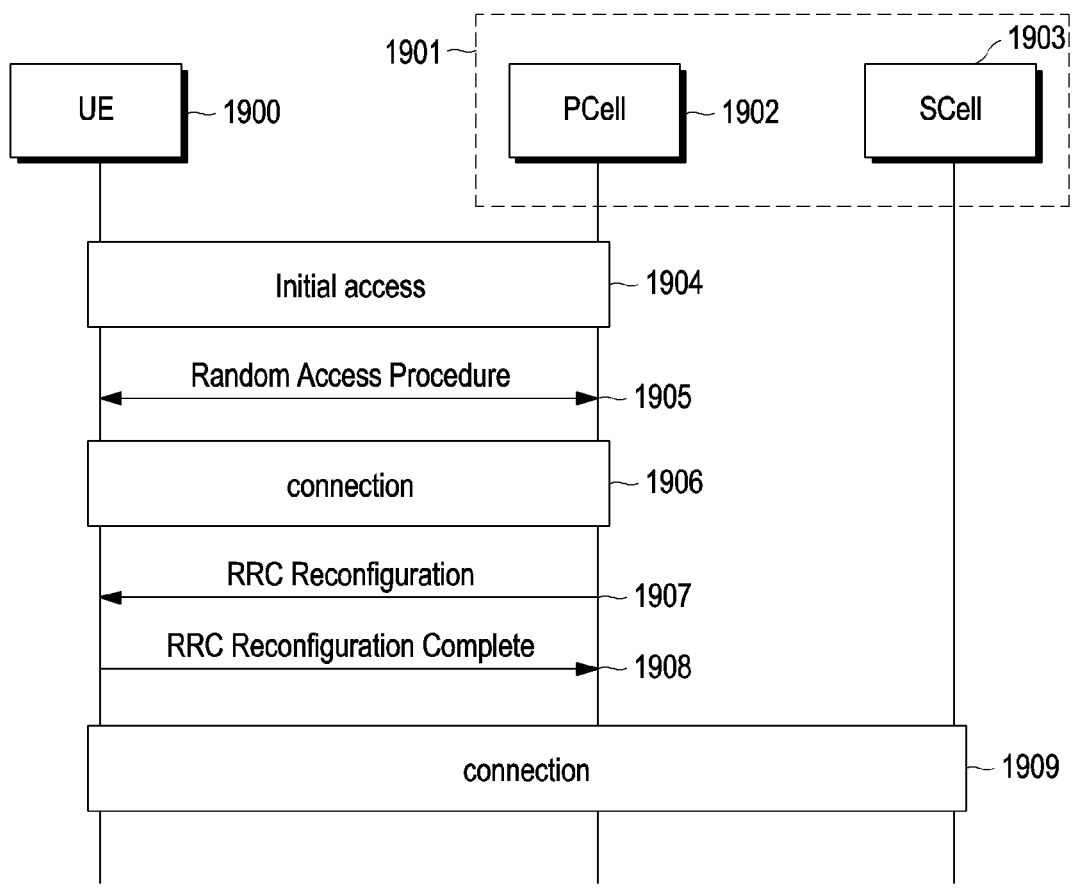
FIG. 19 is a diagram illustrating a procedure of configuring CA in a wireless communication system according to an embodiment of the disclosure.

With reference to FIG. 19, an operation of configuring CA for a terminal will be described.

FIG. 19 is a diagram illustrating a procedure of configuring CA in a wireless communication system according to an embodiment of the disclosure.

Referring to FIG. 19, in operation 1904, a terminal 1900 performs initial access to a base station 1901. In the initial access process, the terminal may acquire DL time and frequency synchronization and obtain a cell ID from a synchronization signal received from the base station through cell search. The terminal may receive a physical broadcast channel (PBCH) using the obtained cell ID, and may obtain an MIB, which is essential system information, from the PBCH. Additionally, the terminal may receive system information (SIB) from the base station to obtain cell-common control information related to transmission and reception. The cell-common transmission/reception-related control information may include random access-related control information, paging-related control information, and/or common control information for various physical channels. A cell accessed by the terminal in operation 1904 may be a PCell.

In operation 1905, the terminal performs random access to the base station, using the random access-related control information obtained from the system information. The terminal that has successfully completed the random access procedure may synchronize UL time with the base station. In addition, the terminal may transition to a connected state, thereby enabling one-to-one communication between the base station and the terminal.

In operation 1906, the terminal performs data transmission and reception with the base station through a PCell 1902. The terminal may report UE capability information to the base station to inform the base station of whether the terminal supports a specific function, a maximum allowed value for the function supported by the terminal, and so on. The UE capability information may include information indicating whether the terminal supports CA and/or CA-related information. The UE capability information may further include information indicating whether the terminal supports cross-carrier scheduling of a PCell by an SCell, an NR PDCCH discovery method supported by the terminal, and so on. In operation 1906, the terminal may report measurements of neighbor cells. For example, when the strength of a signal received from a neighbor cell monitored by the terminal is greater than a specific threshold, the ID of the neighbor cell and the strength of the received signal may be included in a measurement report and transmitted to the base station. An RS monitored for the measurement report by the terminal may be an SS/PBCH block or CSI-RS transmitted by the neighbor cell. The base station may indicate control information for the measurement report of the terminal to the terminal by signaling. The control information for the measurement report of the terminal may include at least part of control information related to the following.

Information about an RS from a neighbor cell to be measured. For example, information indicating whether the RS is an SS/PBCH block or CSI-RS SCS of the RS time/frequency-domain position of the RS Start/frequency-domain size of the RS Information indicating whether the measurement report is to be transmitted periodically or based on a specific event, when the terminal reports the measurement result to the base station.

The base station may determine whether to configure CA for the terminal or indicate handover to another cell, based on the measurement report of the terminal. The determination of whether to configure CA may mean, for example, determining whether to aggregate an additional carrier (SCell) 1903 with the PCell 1902 of the current terminal. When the base station determines CA for the terminal, the base station may transmit related information required for SCell aggregation (necessary information related to CA) in an 'RRC Reconfiguration' message to the terminal in operation 1907. The required CA-related information may include information about a carrier bandwidth and a center frequency of the SCell, and/or common control information for a physical channel of the SCell.

The terminal completes the process for performing communication in the SCell according to the received 'RRC Reconfiguration' message, and then transmits an 'RRC Reconfiguration Complete' message to the base station in operation 1908. From operation 1909, the terminal is placed in the state in which the terminal has completed preparation to transmit and receive data in both the PCell and the SCell of the base station.

Configuration information for signal transmission and reception between the terminal and the base station may be configured on a cell basis. Additionally, the NR system may configure one or more bandwidth parts (BWPs) in one cell and adjust a configuration between the terminal and the base station on a BWP basis. A BWP refers to a subband ranging from at least one RB to up to a system bandwidth in the frequency domain. Configuration information for receiving an NR PDCCH at the terminal may include the CORESET configuration information of Table 4 and/or the search space configuration information of Table 6. The configuration information between the terminal and the base station in the cell is configured in a hierarchical structure in the following order.

1) 'SearvingCellConfig': Includes cell-based TDD UL-DL configuration information, BWP configuration information, and so on.

2) 'BWP': Includes information about the frequency-domain size/position of a BWP, information about an SCS applied to the BWP, NR PDCCH configuration information, NR PDSCH configuration information, NR PUSCH configuration information, NR PUCCH configuration information, NR RACH configuration information, and so on.

3) 'PDCCH-Config': Includes CORESET configuration information, search space configuration information, and so on.

4) 'CORESET': Includes a CORESET ID, CORESET time/frequency configuration information, quasi co-located (QCL) indicator configuration information in DCI, and so on.

5) 'SearchSpace': Includes a search space ID, a CORESET ID, an NR PDCCH monitoring periodicity/offset, an AL, a search space type, and so on.

Figure 20:
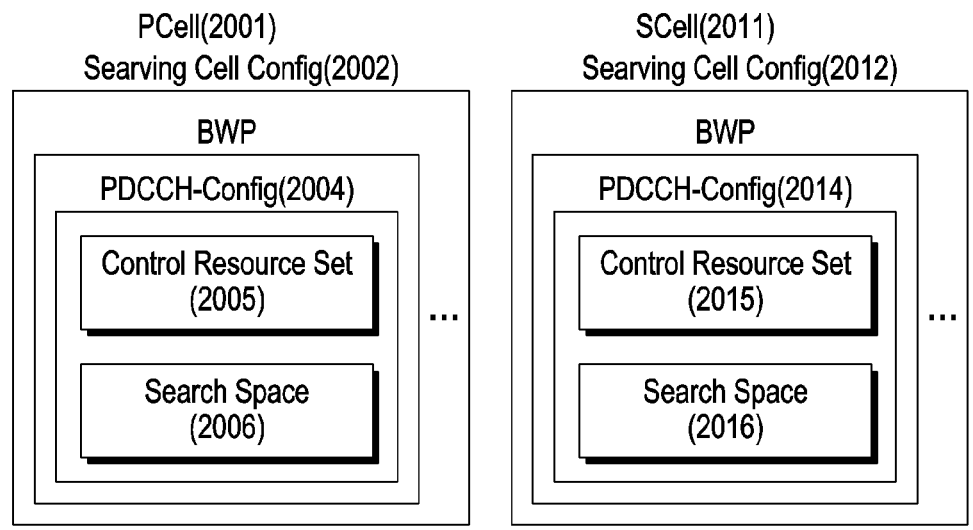
FIG. 20 is a diagram illustrating NR PDCCH configuration information according to an embodiment of the disclosure.

FIG. 20 illustrates a case in which configuration information related to an NR PDCCH of the hierarchical structure is configured for each of a PCell and an SCell for a terminal configured with CA according to an embodiment of the disclosure.

Referring to FIG. 20, the block diagram illustrates a PCell 2001 and an SCell 2011 for a terminal configured with CA.

In the CA, an NR PDCCH-related configuration may be configured for the terminal by the base station through, for example, the 'RRC Reconfiguration' procedure in operation 1907 of FIG. 19.

Specifically, methods of configuring an NR PDCCH in an SCell that cross-carrier schedules a PCell are given as follows.

Method 1 of configuring NR PDCCH of SCell: 'tci-PresentInDCI' is included in CORESET configuration information 2015 for the SCell, and set to 'enable'. 'tci-PresentInDCI=enable' means that configuration information included in the NR PDCCH includes TCI state control information that adjusts a beam configuration (or QCL relationship configuration) for an NR PDSCH. Accordingly, a beam or QCL relationship configuration that may be caused by the difference in channel environment between the SCell in which the NR PDCCH is transmitted and a PCell in which the NR PDSCH is transmitted may be adjusted by the TCI state control information.

A TCI state is used to announce a QCL relationship between an NR PDSCH (or NR PDSCH DMRS) and another RS or channel. When it is said that a certain reference antenna port, antenna port A (reference RS #A) is QCLed with another target antenna port, antenna port B (target RS #B), this implies that the terminal is allowed to apply some or all of large-scale channel parameters estimated from antenna port A to measurement of a channel from antenna port B. For QCL, different parameters need to be associated according to situations, such as 1) time tracking affected by average delay and delay spread, 2) frequency tracking affected by Doppler shift and Doppler spread, 3) radio resource management (RRM) affected by average gain, 4) beam management (BM) affected by a spatial parameter, of a radio channel.

In Method 1, search space configuration information 2016 for an SCell 2011 and search space configuration information 2006 for a PCell 2001 are configured to be the same. For example, a 'search space ID' value in the search space configuration information 2016 for the SCell 2011 is matched to a 'search space ID' value in the search space configuration information 2006 for the PCell 2001. Accordingly, the terminal applies the same search space configuration information regardless of whether an NR PDCCH scheduling the PCell 2001 is transmitted in the PCell 2001 (i.e., self-carrier scheduling) or in the SCell 2011 (i.e., cross-carrier scheduling), thereby reducing the complexity of NR PDCCH monitoring.

Method 2 of configuring NR PDCCH of SCell: In addition to the configuration of Method 1 of configuring an NR PDCCH of an SCell, CORESET configuration information 2015 for the SCell 2011 and CORESET configuration information 2005 for the PCell 2001 are configured to be the same. For example, a 'CORESET ID' value in the CORESET configuration information 2015 for the SCell 2011 is matched to a 'CORESET ID' value in the CORESET configuration information 2005 for the PCell 2001. Accordingly, the terminal applies the same CORESET configuration information regardless of whether an NR PDCCH scheduling the PCell 2001 is transmitted in the PCell 2001 (i.e., self-carrier scheduling) or in the SCell 2011 (i.e., cross-carrier scheduling), thereby reducing the complexity of NR PDCCH monitoring. In a modification example of Method 2 of configuring an NR PDCCH of an SCell, CORESET configuration information for an SCell that cross-carrier schedules a PCell and another CORESET configuration information for the SCell that self-carrier schedules the SCell may be configured to be the same. Therefore, the terminal applies the same CORESET configuration information regardless of whether an NR PDCCH transmitted in the SCell cross-carrier schedules the PCell or self-carrier schedules the SCell, thereby reducing the complexity of NR PDCCH monitoring.

Method 3 of configuring NR PDCCH of SCell: An NR PDCCH configuration 2014 for the SCell 2011 and an NR PDCCH configuration 2004 for the PCell 2001 are independently configured without any additional restriction. That is, CORESET configurations and search space configurations are configured independently for the SCell 2011 and the PCell 2002. Accordingly, the base station may transmit an NR PDCCH according to the characteristics of each of the PCell 2001 and the SCell 2011. For example, as described with reference to FIG. 13, the degree of freedom for NR PDCCH mapping may be lower in the PCell where LTE and 5G co-exist than in the SCell. In this case, an NR PDCCH transmission may be performed adaptively according to the characteristics of each cell by Method 3.

The base station may determine a method to be applied among Method 1, Method 2, and Method 3 and indicate the determined method to the terminal.

Figure 21:
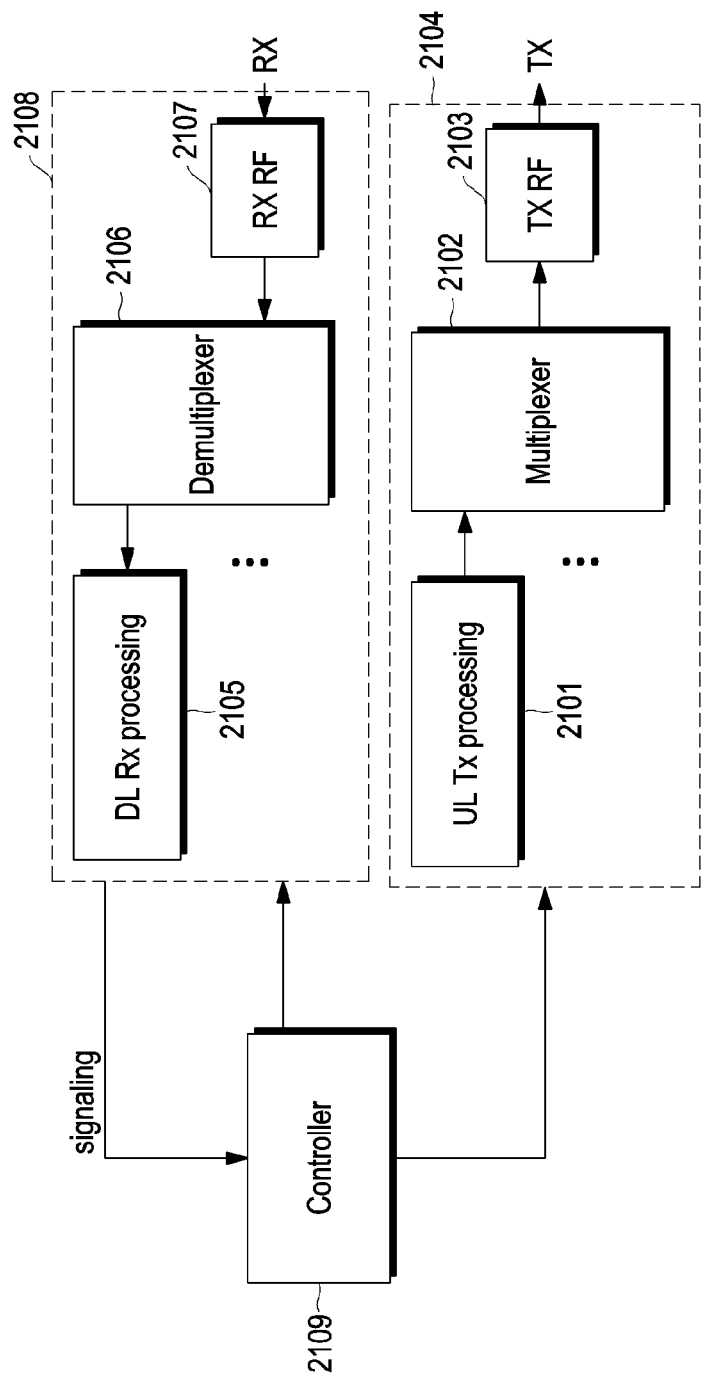
FIG. 21 is a block diagram illustrating a transmission and reception apparatus of a terminal in a wireless communication system according to an embodiment of the disclosure.

FIG. 21 is a block diagram illustrating a transmission and reception apparatus of a terminal in a wireless communication system according to an embodiment of the disclosure.

For convenience of description, an illustration and description of the transmission and reception apparatus, which are not directly relevant to the disclosure, will be avoided herein.

Referring to FIG. 21, the terminal may include a transmitter 2104 including a UL transmission (Tx) processor 2101, a multiplexer 2102, and a Tx radio frequency (RF) block 2103, a receiver 2108 including a DL reception (Rx) processor 2105, a demultiplexer 2106, and an Rx RF block 2107, and a controller 2109. As described before, the controller 2109 may control each component of the receiver 2108 for receiving a data channel or a control channel from a base station, and each component of the transmitter 2104 for transmitting a UL signal.

The UL Tx processor 2101 of the transmitter 2104 in the terminal may generate an intended transmission signal by performing processes such as channel coding, modulation, and so on. The signal generated in the UL Tx processor 2101 may be multiplexed with another UL signal by the multiplexer 2102, signal-processed by the Tx RF block 2103, and transmitted to a base station.

The receiver 2108 of the terminal demultiplexes a signal received from the base station and distributes the demultiplexed signals to respective DL Rx processors. The DL Rx processor 2105 may obtain control information or data transmitted by the base station by performing processes on the DL signal, such as demodulation, channel decoding, and so on. The receiver 2108 of the terminal may support an operation of the controller 2109 by applying the result of the DL Rx processors to the controller 2109.

Figure 22:
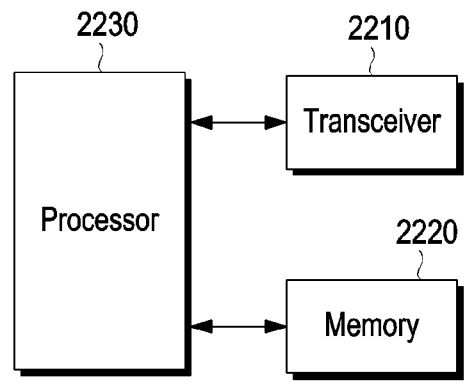
FIG. 22 is a block diagram illustrating the configuration of a terminal according to an embodiment of the disclosure.

FIG. 22 is a block diagram illustrating the configuration of a terminal according to an embodiment of the disclosure.

Referring to FIG. 22, the terminal of the disclosure may include a processor 2230, a transceiver 2210, and a memory 2220. However, the components of the terminal are not limited to this example. For example, the terminal may include more or fewer components than the above-described components. Besides, the processor 2230, the transceiver 2210, and the memory 2220 may be implemented on a single chip. According to an embodiment, the transceiver 2210 of FIG. 22 may include the transmitter 2104 and the receiver 2108 of FIG. 21. Further, the processor 2230 of FIG. 22 may include the controller 2109 of FIG. 21.

According to an embodiment, the processor 2230 may control a series of processes in which the terminal may operate according to the above-described embodiments of the disclosure. For example, in a wireless communication system to which CA according to an embodiment of the disclosure is applied, the components of the terminal may be controlled to perform the transmission/reception methods of the terminal. There may be at least one processor 2230, and the processor 2230 may execute a program stored in the memory 2220 to perform a transmission/reception operation of the terminal in a wireless communication system to which CA of the disclosure is applied.

The transceiver 2210 may transmit and receive a signal to and from a base station. The signal transmitted to and received from the base station may include control information and data. The transceiver 2210 may include an RF transmitter for up-converting and amplifying the frequency of a transmission signal, and an RF receiver for low-noise amplifying and down-converting a received signal. However, the transceiver 2210 is merely an embodiment, and the components of the transceiver 2210 are not limited to the RF transmitter and the RF receiver. In addition, the transceiver 2210 may receive a signal on a radio channel, output the received signal to the processor 2230, and transmit a signal received from the processor 2230 on a radio channel.

According to an embodiment, the memory 2220 may store a program and data needed for the operations of the terminal. The memory 2220 may also store control information or data included in a signal transmitted and received by the terminal. The memory 2220 may be configured as a storage medium or a combination of storage media, such as a read only memory (ROM), a random access memory (RAM), a hard disk, a compact disc-read only memory (CD-ROM), and a digital versatile disc (DVD). In addition, a plurality of memories 2220 may be provided. According to an embodiment, the memory 2220 may store a program for performing a transmission and reception operation of the terminal in a wireless communication system to which CA according to the above-described embodiments of the disclosure is applied.

Figure 23:
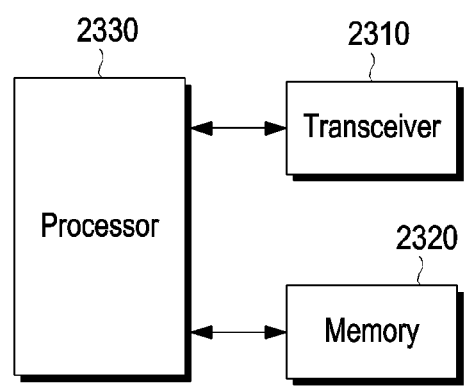
FIG. 23 is a block diagram illustrating the configuration of a BS according to an embodiment of the disclosure.

FIG. 23 is a block diagram illustrating the configuration of a base station according to an embodiment of the disclosure.

Referring to FIG. 23, the base station of the disclosure may include a processor 2330, a transceiver 2310, and a memory 2320. However, the components of the base station are not limited to the above example. For example, the base station may include more or fewer components than the afore-mentioned components. In addition, the processor 2330, the transceiver 2310, and the memory 2320 may be implemented on a single chip.

The processor 2330 may control a series of processes so that the base station may operate according to the above-described embodiments of the disclosure. For example, the components of the base station may be controlled to perform a method of scheduling a terminal in a mobile communication system supporting CA according to an embodiment of the disclosure. There may be at least one processor 2330, and the processor 2330 may execute a program stored in the memory 2320 to perform a method of scheduling a terminal in a mobile communication system supporting CA of the disclosure described above.

The transceiver 2310 may transmit and receive a signal to and from a terminal. The signal transmitted to and received from the terminal may include control information and data. The transceiver 2310 may include an RF transmitter for up-converting and amplifying the frequency of a transmission signal, and an RF receiver for low-noise amplifying and down-converting a received signal. However, the transceiver 2310 is only an example, and the components of the transceiver 2310 are not limited to the RF transmitter and the RF receiver. In addition, the transceiver 2310 may receive a signal on a radio channel, output the received signal to the processor 2330, and transmit a signal received from the processor 2330 on a radio channel.

According to an embodiment, the memory 2320 may store a program and data needed for the operations of the base station. The memory 2320 may also store control information or data included in a signal transmitted and received by the base station. The memory 2320 may be configured as a storage medium or a combination of storage media, such as a ROM, a RAM, a hard disk, a CD-ROM, and a DVD. A plurality of memories 2320 may be provided. According to an embodiment, the memory 2320 may store a program for performing a method of scheduling a terminal in a mobile communication system supporting CA according to the above-described embodiments of the disclosure.

Methods according to the embodiments described in the claims or the description of the disclosure may be implemented in hardware, software, or a combination of hardware and software.

When the methods are implemented in software, a computer-readable storage medium or computer program product storing at least one program (software module) may be provided. The at least one program stored in the computer-readable storage medium or computer program product is configured for execution by at least one processor in an electronic device. The at least one program includes instructions that cause the electronic device to execute the methods according to embodiments described in the claim or specification of the disclosure.

The program (software module or software) may be stored in a RAM, a non-volatile memory including flash memory, a ROM, an electrically erasable programmable ROM (EEPROM), a magnetic disc storage device, a CD-ROM, a DVDs, or any other type of optical storage device, or a magnetic cassette. Alternatively, the program may be stored in a memory including a combination of some or all of them. In addition, each constituent memory may be included in plurality.

In addition, the program may be stored in an attachable storage device accessible through a communication network such as the Internet, Intranet, a local area network (LAN), a wireless LAN (WLAN), or a storage area network (SAN), or a combination thereof. Such a storage device may be connected to an apparatus implementing an embodiment of the disclosure through an external port. Further, a separate storage device on the communication network may be connected to the apparatus implementing the embodiment of the disclosure.

In the disclosure, the term "computer program product" or "computer-readable recording medium" is used to generically refer to a medium such as a memory, a hard disk installed in a hard disk drive, and a signal. The "computer program product" or "computer-readable recording medium" is a means provided for a transmission and reception method of a terminal in a wireless communication system to which CA according to the disclosure is applied.

Preferred embodiments of the disclosure have been disclosed in the specification and drawings. Although specific terms are used, these are only used in a general sense to easily explain the technical content of the disclosure and help the understanding of the disclosure, not intended to limit the scope of the disclosure. For example, while the disclosure is based on a scenario of different LTE and 5G systems in combination, it may be generalized and applied to a CA operation in the same system (e.g., 5G). Alternatively, it may be applied to a scenario of combining 5G and 6G systems to be introduced in the future. It will be apparent to those skilled in the art that other modifications can be made based on the technical spirit of the disclosure in addition to the embodiments disclosed herein. In addition, the above embodiments may be practiced in combination with each other as needed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a user equipment (UE) in a wireless communication system, the method comprising:
   transmitting, to a base station, capability information including first information indicating support of cross-carrier scheduling from a secondary cell (SCell) to a primary cell (PCell), the capability information including second information indicating a physical downlink control channel (PDCCH) monitoring method supported by the UE;
   receiving, from the base station, configuration information for the cross-carrier scheduling from the SCell to the PCell, wherein the configuration information includes third information about transmission of at least one PDCCH on at least one first slot of the SCell for the cross-carrier scheduling of at least one second slot of the PCell;
   in case that the third information indicates that the transmission of the at least one PDCCH is restricted on the at least one first slot of the SCell, monitoring the at least one PDCCH on the at least one first slot of the SCell overlapping with in part of the at least one second slot of the PCell;
   in case that the third information does not indicate that the transmission of the at least one PDCCH is restricted on the at least one first slot of the SCell, monitoring the at least one PDCCH on the at least one first slot of the SCell overlapping with the at least one second slot of the PCell; and
   receiving, from the base station, at least one downlink control information (DCI) via the at least one PDCCH.

2. The method of claim 1, further comprising:
   receiving downlink data via a physical downlink shared channel (PDSCH) or transmitting uplink data via a physical uplink shared channel (PUSCH), based on the at least one DCI.

3. A method of a base station in a wireless communication system, the method comprising:
   receiving, from a user equipment (UE), capability information including first information indicating support of cross-carrier scheduling from a secondary cell (SCell) to a primary cell (PCell), the capability information including second information indicating a physical downlink control channel (PDCCH) monitoring method supported by the UE;
   transmitting, to the UE, configuration information for the cross-carrier scheduling from the SCell to the PCell, wherein the configuration information includes third information about transmission of at least one PDCCH on at least one first slot of the SCell for the cross-carrier scheduling of at least one second slot of the PCell; and
   transmitting, to the UE, at least one downlink control information (DCI) via the at least one PDCCH on the at least one first slot of the SCell based on the configuration information,
   wherein the at least one PDCCH is transmitted on the at least one first slot of the SCell overlapping with in part of the at least one second slot of the PCell, in case that the third information indicates that the transmission of the at least one PDCCH is restricted on the at least one first slot of the SCell, and
   wherein the at least one PDCCH is transmitted on the at least one first slot of the SCell overlapping with the at least one second slot of the PCell, in case that the third information does not indicate that the transmission of the at least one PDCCH is restricted on the at least one first slot of the SCell.

4. The method of claim 3, further comprising:
performing scheduled operation with the UE based on the at least one DCI.

5. A user equipment (UE) in a wireless communication system, the UE comprising:
a transceiver; and
at least one processor coupled to the transceiver and configured to:
  transmit, to a base station, capability information including first information indicating support of cross-carrier scheduling from a secondary cell (SCell) to a primary cell (PCell), the capability information including second information indicating a physical downlink control channel (PDCCH) monitoring method supported by the UE,
  receive, from the base station, configuration information for the cross-carrier scheduling from the SCell to the PCell, wherein the configuration information includes third information about transmission of at least one PDCCH on at least one first slot of the SCell for the cross-carrier scheduling of at least one second slot of the PCell,
  in case that the third information indicates that the transmission of the at least one PDCCH is restricted on the at least one first slot of the SCell, monitor the at least one PDCCH on the at least one first slot of the SCell overlapping with in part of the at least one second slot of the PCell.
  in case that the third information does not indicate that the transmission of the at least one PDCCH is restricted on the at least one first slot of the SCell. monitor the at least one PDCCH on the at least one first slot of the SCell overlapping with the at least one second slot of the PCell, and
  receive, from the base station, at least one downlink control information (DCI) via the at least one PDCCH.

6. The UE of claim 5, wherein the at least one processor is further configured to:
  receive downlink data via a physical downlink shared channel (PDSCH) or transmit uplink data via a physical uplink shared channel (PUSCH), based on the at least one DCI.

7. A base station in a wireless communication system, the base station comprising:
a transceiver; and
at least one processor coupled to the transceiver and configured to:
  receive, from a user equipment (UE), capability information including first information indicating support of cross-carrier scheduling from a secondary cell (SCell) to a primary cell (PCell), the capability information including second information indicating a physical downlink control channel (PDCCH) monitoring method supported by the UE,
  transmit, to the UE, configuration information for the cross-carrier scheduling from the SCell to the PCell, wherein the configuration information includes third information about transmission of at least one PDCCH on at least one first slot of the SCell for the cross-carrier scheduling of at least one second slot of the PCell, and
  transmit, to the UE, at least one downlink control information (DCI) via the at least one PDCCH on the at least one first slot of the SCell based on the configuration information, .
wherein the at least one PDCCH is transmitted on the at least one first slot of the SCell overlapping with in part of the at least one second slot of the PCell, in case that the third information indicates that the transmission of the at least one PDCCH is restricted on the at least one first slot of the SCell, and
wherein the at least one PDCCH is transmitted on the at least one first slot of the SCell overlapping with the at least one second slot of the PCell, in case that the third information does not indicate that the transmission of the at least one PDCCH is restricted on the at least one first slot of the SCell.

8. The base station of claim 7, wherein the at least one processor is further configured to:
perform scheduled operation with the UE based on the at least one DCI.

* * * * *